United States Patent
Tan

(10) Patent No.: US 10,756,994 B2
(45) Date of Patent: Aug. 25, 2020

(54) SWITCH, CONTROLLER, SYSTEM, AND LINK QUALITY DETECTION METHOD

(71) Applicant: Huawei Technologies Co., Ltd., Shenzhen (CN)

(72) Inventor: Shiyong Tan, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 292 days.

(21) Appl. No.: 15/469,190

(22) Filed: Mar. 24, 2017

(65) Prior Publication Data

US 2017/0201435 A1 Jul. 13, 2017

Related U.S. Application Data

(63) Continuation of application No. PCT/CN2014/087574, filed on Sep. 26, 2014.

(51) Int. Cl.
*H04L 12/26* (2006.01)
*H04L 12/24* (2006.01)
(Continued)

(52) U.S. Cl.
CPC ............ *H04L 43/08* (2013.01); *H04L 41/085* (2013.01); *H04L 41/0853* (2013.01);
(Continued)

(58) Field of Classification Search
CPC . H04L 12/1863; H04L 12/6418; H04L 45/38; H04L 45/54; H04L 45/64;
(Continued)

(56) References Cited

U.S. PATENT DOCUMENTS 8,665,699 B2 * 3/2014 Bellagamba ........ H04L 41/0677
370/216
9,813,323 B2 * 11/2017 Emmadi ................ H04L 43/12
(Continued)

FOREIGN PATENT DOCUMENTS

CN 1815970 A 8/2006
CN 1937541 A 3/2007
(Continued)

OTHER PUBLICATIONS

Open Networking Foundation, "OpenFlow Switch Specification", Version 1.4.0, Oct. 14, 2013, 206 pages total.*
(Continued)

*Primary Examiner* — Todd L Barker
(74) *Attorney, Agent, or Firm* — Leydig, Voit & Mayer, Ltd.

(57) ABSTRACT

Embodiments of the present invention provide a switch, a controller, a system, and a link quality detection method, and pertain to the field of network technologies. In the present invention, the controller determines a detection path, and controls each switch on the detection path to obtain a detection packet, so that after determining that the obtained detection packet matches a prestored flow table entry, each switch adds OAM information to the successfully matched detection packet; and the controller obtains a termination detection packet, and determines link quality according to the termination detection packet. Each switch on a detection path does not need to use a corresponding link quality detection protocol to detect link quality, and only needs to add OAM information to an obtained detection packet. In this way, not only a structure of each switch can be simplified, but also operations of each switch are simplified.

23 Claims, 16 Drawing Sheets

(51) Int. Cl.
*H04L 12/833* (2013.01)
*H04L 12/825* (2013.01)
*H04L 12/715* (2013.01)
*H04L 12/841* (2013.01)

(52) U.S. Cl.
CPC .............. *H04L 41/12* (2013.01); *H04L 43/14* (2013.01); *H04L 47/31* (2013.01); *H04L 45/64* (2013.01); *H04L 47/266* (2013.01); *H04L 47/283* (2013.01)

(58) Field of Classification Search
CPC ... H04L 41/085; H04L 41/0853; H04L 41/12; H04L 43/08; H04L 43/14; H04L 47/31; H04L 47/266; H04L 47/283
See application file for complete search history.

(56) References Cited

U.S. PATENT DOCUMENTS

| | | | | |
|---|---|---|---|---|
| 2009/0052321 | A1* | 2/2009 | Kamath | .................. H04L 45/00 370/235 |
| 2011/0286324 | A1 | 11/2011 | Bellagamba et al. | |
| 2013/0010600 | A1* | 1/2013 | Jocha | .................... H04L 43/026 370/236.2 |
| 2013/0258898 | A1 | 10/2013 | Gao et al. | |
| 2015/0195184 | A1* | 7/2015 | Vasseur | ............... H04L 41/5025 706/12 |
| 2015/0319057 | A1* | 11/2015 | Jocha | .................... H04L 43/026 370/241.1 |
| 2016/0013990 | A1* | 1/2016 | Kulkarni | ................. H04L 41/22 709/224 |
| 2017/0264557 | A1* | 9/2017 | John | ....................... H04L 45/64 |
| 2017/0295035 | A1* | 10/2017 | Mathew | ............... H04L 12/6418 |
| 2017/0302539 | A1* | 10/2017 | Park | .................... H04L 41/5016 |

FOREIGN PATENT DOCUMENTS

| | | |
|---|---|---|
| CN | 101699786 A | 4/2010 |
| CN | 103051499 A | 4/2013 |
| CN | 103262472 A | 8/2013 |
| CN | 103765823 A | 4/2014 |
| JP | 2005202446 A | 7/2005 |

OTHER PUBLICATIONS

Chinese Application No. CN/201480018333.5, Office Action, dated Apr. 8, 2020.

* cited by examiner

SWITCH, CONTROLLER, SYSTEM, AND LINK QUALITY DETECTION METHOD

CROSS-REFERENCE TO RELATED APPLICATIONS

This application is a continuation of International Application No. PCT/CN2014/087574, filed on Sep. 26, 2014, the disclosure of which is hereby incorporated by reference in its entirety.

TECHNICAL FIELD

The present invention relates to the field of network technologies, and in particular, to a switch, a controller, a system, and a link quality detection method.

BACKGROUND

To improve network deployment flexibility and manageability, an SDN (Software Defined Networking, software-defined networking)-based network implementation manner is widely used. In SDN, a control function and a forwarding function of a network element are decoupled, and a network element in a network is divided into two parts: a control plane and a forwarding plane. Quality of a link between the control plane and the forwarding plane or between network elements of the forwarding plane directly affects quality of a network transmission service, for example, link connectivity, bandwidth, a packet loss rate, a delay, jitter, and the like affect quality of a network transmission service. Therefore, an SDN-based link quality detection method is of great significance.

The OpenFlow (OpenFlow) protocol is currently a main control protocol between the control plane and the forwarding plane in SDN. In the OpenFlow protocol, a control plane network element is referred to as an OpenFlow Controller (OpenFlow controller, hereinafter referred to as controller), and a forwarding plane network element is referred to as an OpenFlow Switch (OpenFlow switch, hereinafter referred to as switch). In a related technology, during implementation of SDN-based link quality detection, a switch generally detects link quality with reference to a network technology of the switch and by using a link quality detection protocol corresponding to the network technology, and reports a detection result to a controller or provides a detection result to a controller for querying. For example, if the network technology of the switch is an Ethernet technology, the switch detects link quality by using an Ethernet link detection protocol, and reports a detection result to the controller or provides a detection result to the controller for querying. Because different network technologies correspond to different link detection protocols, the switch needs to implement different link quality detection protocols, and then report a detection result to the controller or provides a detection result to the controller for querying. BFD (Bidirectional Forwarding Detection, bidirectional forwarding detection) is used as an example. BFD mainly implements detection of link connectivity, and both two switches at two ends of a link need to implement a BFD protocol stack, maintain a state machine, and send a packet to each other according to a BFD protocol, to detect link connectivity.

The prior art has the following disadvantages:

In the related technology, because the switch needs to use different link quality detection protocols to detect link quality for different network technologies, the switch needs to implement multiple link quality detection protocols; therefore, device complexity of the switch is increased. In addition, different link quality detection protocols are generally used to detect different kinds of content, for example, some are used to detect connectivity, and some are used to detect a delay. The link quality detection protocols vary in function. Therefore, link quality detection manners vary, and if different kinds of content need to be detected, the switch needs to implement multiple link quality detection protocols, and operations are complex. Moreover, in this manner, because there is a large quantity of interface messages between the controller and the switch, the controller needs to query link quality from multiple switches, or multiple switches need to report link quality; therefore, interaction between the controller and the switch is increased, and network service processing efficiency is affected. In addition, when implementing a link quality detection protocol, the switch generally needs to maintain a state machine; therefore, implementation of the switch is complex.

SUMMARY

To resolve a problem in the prior art, embodiments of the present invention provide a switch, a controller, a system, and a link quality detection method. The technical solutions are as follows:

According to a first aspect, a software-defined networking system is provided, where the system includes a controller and at least one switch, where the controller is configured to: determine a detection path; control each switch on the detection path to obtain a detection packet, so that after determining that the obtained detection packet matches a flow table entry prestored in each switch, each switch adds OAM (Operation Administration and Maintenance, operation, administration, and maintenance) information to the successfully matched detection packet according to the flow table entry prestored in each switch; obtain a termination detection packet obtained after each switch adds the OAM information to the obtained detection packet; and determine link quality according to the termination detection packet; and each switch of the at least one switch is configured to: obtain the detection packet, perform matching on the obtained detection packet, add the OAM information to the successfully matched detection packet according to the corresponding flow table entry, and then send, to a next switch on the detection path or the controller, the detection packet to which the OAM information is added.

According to a second aspect, a switch is provided, where the switch includes:

an obtaining module, configured to obtain a detection packet, where the obtained detection packet comes from a previous switch on a detection path determined by a controller or the controller;

a determining module, configured to determine whether the obtained detection packet matches a locally prestored flow table entry;

an adding module, configured to add OAM information to the obtained detection packet according to the locally prestored flow table entry when the obtained detection packet matches the locally prestored flow table entry; and a sending module, configured to send, to a next switch on the detection path, the detection packet to which the OAM information is added, until the last switch on the detection path adds OAM information to an obtained detection packet according to a prestored flow table entry, to obtain a termination detection packet, and sends the termination detection packet to the controller, and the controller determines link quality according to the termination detection packet.

With reference to the second aspect, in a first possible implementation manner of the second aspect, the obtaining module is configured to:

when the local switch is the first switch on the detection path, receive an initial detection packet sent by the controller, and use the received initial detection packet as the obtained detection packet; or receive a detection packet generation instruction sent by the controller, generate an initial detection packet according to the detection packet generation instruction, and use the generated initial detection packet as the obtained detection packet; or when the local switch is not the first switch on the detection path, receive a detection packet to which a previous switch on the detection path adds OAM information, and use the received detection packet to which the previous switch adds the OAM information as the obtained detection packet.

With reference to the second aspect, in a second possible implementation manner of the second aspect, the switch further includes:

a receiving module, configured to receive and store the flow table entry sent by the controller, where the flow table entry is used to instruct the local switch to: perform matching on the obtained detection packet, add the OAM information to the successfully matched detection packet according to the locally prestored flow table entry to obtain the detection packet to which the local OAM information is added, and then send, to a next switch on the detection path or the controller by using an egress port specified in the flow table entry, the detection packet to which the local OAM information is added.

With reference to the second aspect, in a third possible implementation manner of the second aspect, the detection packet obtained by the obtaining module carries a detection path ID (Identity, identity), and the determining module includes:

a parsing unit, configured to parse a packet header field and the detection path ID in the obtained detection packet; and a determining unit, configured to determine, according to at least one piece of information of the packet header field and the detection path ID in the obtained detection packet, whether the obtained detection packet matches the locally prestored flow table entry.

With reference to the second aspect, in a fourth possible implementation manner of the second aspect, the OAM information added by the local switch to the obtained detection packet includes at least one piece of information of used bandwidth of an ingress port, idle bandwidth of an ingress port, used bandwidth of an egress port, idle bandwidth of an egress port, a total quantity of detection packets, a detection packet receiving time stamp, and a detection packet sending time stamp.

According to a third aspect, a controller is provided, where the controller includes:

a first determining module, configured to determine a detection path, where the detection path includes at least one switch;

a control module, configured to control each switch on the detection path to obtain a detection packet, so that after determining that the obtained detection packet matches a flow table entry prestored in each switch, each switch adds OAM information to the successfully matched detection packet according to the flow table entry prestored in each switch;

an obtaining module, configured to obtain a termination detection packet obtained after each switch adds the OAM information to the obtained detection packet; and a second determining module, configured to determine link quality according to the termination detection packet.

With reference to the third aspect, in a first possible implementation manner of the third aspect, the controller further includes:

a sending module, configured to send, to each switch on the detection path, the flow table entry corresponding to each switch, where the flow table entry corresponding to each switch is used to instruct each switch to: perform matching on the obtained detection packet, add the OAM information to the successfully matched detection packet according to the flow table entry prestored in each switch, and then send, to a next switch on the detection path or the controller by using an egress port specified in the flow table entry corresponding to each switch, the detection packet to which the OAM information is added.

With reference to the third aspect, in a second possible implementation manner of the third aspect, the first determining module is configured to determine the detection path according to network configuration information; or generate a detection path according to network topology information, and use the generated detection path as the determined detection path.

With reference to the third aspect, in a third possible implementation manner of the third aspect, the control module is configured to:

when the switch is the first switch on the detection path, control sending an initial detection packet to the first switch, so that the first switch uses the received initial detection packet as the obtained detection packet; or control sending a detection packet generation instruction to the first switch, so that the first switch generates an initial detection packet according to the detection packet generation instruction, and uses the generated initial detection packet as the obtained detection packet; or when the switch is not the first switch on the detection path, control the switch to: receive a detection packet that is sent by a previous switch on the detection path and to which the previous switch adds OAM information, and use the received detection packet to which the previous switch adds the OAM information as the obtained detection packet.

With reference to the third possible implementation manner of the third aspect, in a fourth possible implementation manner of the third aspect, the control module is configured to control periodically sending the initial detection packet to the first switch; and the second determining module is configured to: determine whether no termination detection packet corresponding to each initial detection packet is received within a preset quantity of periods; and if determining that no termination detection packet corresponding to each initial detection packet is received within the preset quantity of periods, determine that the detection path is faulty.

With reference to the third possible implementation manner of the third aspect, in a fifth possible implementation manner of the third aspect, the initial detection packet carries a generation time stamp of the initial detection packet and a packet sequence number of the initial detection packet, and the controller further includes:

a recording module, configured to record a total quantity of received termination detection packets and a receiving time stamp of the termination detection packet; where the second determining module is configured to determine the link quality according to at least one piece of information of the generation time stamp of the initial detection packet, the packet sequence number of the initial detection packet, the OAM information that is carried in the termination detection packet and added by each switch, the total quantity of termination detection packets, and the receiving time stamp of the termination detection packet.

According to a fourth aspect, a link quality detection method is provided, where the method includes:

obtaining a detection packet, where the obtained detection packet comes from a previous switch on a detection path determined by a controller or the controller;

determining whether the obtained detection packet matches a locally prestored flow table entry;

adding OAM information to the obtained detection packet according to the locally prestored flow table entry when the obtained detection packet matches the locally prestored flow table entry; and sending, to a next switch on the detection path, the detection packet to which the OAM information is added, until the last switch on the detection path adds OAM information to an obtained detection packet according to a prestored flow table entry, to obtain a termination detection packet, and sends the termination detection packet to the controller, and the controller determines link quality according to the termination detection packet.

With reference to the fourth aspect, in a first possible implementation manner of the fourth aspect, the obtaining a detection packet includes:

when the local switch is the first switch on the detection path, receiving an initial detection packet sent by the controller, and using the received initial detection packet as the obtained detection packet; or receiving a detection packet generation instruction sent by the controller, generating an initial detection packet according to the detection packet generation instruction, and using the generated initial detection packet as the obtained detection packet; or when the local switch is not the first switch on the detection path, receiving a detection packet to which a previous switch on the detection path adds OAM information, and using the received detection packet to which the previous switch adds the OAM information as the obtained detection packet.

With reference to the fourth aspect, in a second possible implementation manner of the fourth aspect, before the determining whether the obtained detection packet matches a locally prestored flow table entry, the method further includes:

receiving and storing the flow table entry sent by the controller, where the flow table entry is used to instruct the local switch to: perform matching on the obtained detection packet, add the OAM information to the successfully matched detection packet according to the locally prestored flow table entry to obtain the detection packet to which the local OAM information is added, and then send, to a next switch on the detection path or the controller by using an egress port specified in the flow table entry, the detection packet to which the local OAM information is added.

With reference to the fourth aspect, in a third possible implementation manner of the fourth aspect, the obtained detection packet carries a detection path ID, and the determining whether the obtained detection packet matches a locally prestored flow table entry includes:

parsing a packet header field and the detection path ID in the obtained detection packet; and determining, according to at least one piece of information of the packet header field and the detection path ID in the obtained detection packet, whether the obtained detection packet matches the locally prestored flow table entry.

With reference to the fourth aspect, in a fourth possible implementation manner of the fourth aspect, the OAM information added by the local switch to the obtained detection packet includes at least one piece of information of used bandwidth of an ingress port, idle bandwidth of an ingress port, used bandwidth of an egress port, idle bandwidth of an egress port, a total quantity of detection packets, a detection packet receiving time stamp, and a detection packet sending time stamp.

According to a fifth aspect, a link quality detection method is provided, where the method includes:

determining a detection path, where the detection path includes at least one switch;

controlling each switch on the detection path to obtain a detection packet, so that after determining that the obtained detection packet matches a flow table entry prestored in each switch, each switch adds OAM information to the successfully matched detection packet according to the flow table entry prestored in each switch;

obtaining a termination detection packet obtained after each switch adds the OAM information to the obtained detection packet; and determining link quality according to the termination detection packet.

With reference to the fifth aspect, in a first possible implementation manner of the fifth aspect, before the controlling each switch on the detection path to obtain a detection packet, the method further includes:

sending, to each switch on the detection path, the flow table entry corresponding to each switch, where the flow table entry corresponding to each switch is used to instruct each switch to: perform matching on the obtained detection packet, add the OAM information to the successfully matched detection packet according to the flow table entry prestored in each switch, and then send, to a next switch on the detection path or the controller by using an egress port specified in the flow table entry corresponding to each switch, the detection packet to which the OAM information is added.

With reference to the fifth aspect, in a second possible implementation manner of the fifth aspect, the determining a detection path includes:

determining the detection path according to network configuration information; or generating a detection path according to network topology information, and using the generated detection path as the determined detection path.

With reference to the fifth aspect, in a third possible implementation manner of the fifth aspect, the controlling each switch on the detection path to obtain a detection packet includes:

if the switch is the first switch on the detection path, controlling sending an initial detection packet to the first switch, so that the first switch uses the received initial detection packet as the obtained detection packet; or controlling sending a detection packet generation instruction to the first switch, so that the first switch generates an initial detection packet according to the detection packet generation instruction, and uses the generated initial detection packet as the obtained detection packet; or when the switch is not the first switch on the detection path, controlling the switch to: receive a detection packet that is sent by a previous switch on the detection path and to which the previous switch adds OAM information, and use the received detection packet to which the previous switch adds the OAM information as the obtained detection packet.

With reference to the third possible implementation manner of the fifth aspect, in a fourth possible implementation manner of the fifth aspect, the controlling sending an initial detection packet to the first switch includes:

controlling periodically sending the initial detection packet to the first switch; and the determining link quality according to the termination detection packet includes:

determining whether no termination detection packet corresponding to each initial detection packet is received within a preset quantity of periods; and if determining that no termination detection packet corresponding to each initial detection packet is received within the preset quantity of periods, determining that the detection packet is faulty.

With reference to the third possible implementation manner of the fifth aspect, in a fifth possible implementation manner of the fifth aspect, the initial detection packet carries a generation time stamp of the initial detection packet and a packet sequence number of the initial detection packet, and after the obtaining a termination detection packet obtained after each switch adds the OAM information to the obtained detection packet, the method further includes:

recording a total quantity of received termination detection packets and a receiving time stamp of the termination detection packet; and the determining link quality according to the termination detection packet includes:

determining the link quality according to at least one piece of information of the generation time stamp of the initial detection packet, the packet sequence number of the initial detection packet, the OAM information that is carried in the termination detection packet and added by each switch, the total quantity of termination detection packets, and the receiving time stamp of the termination detection packet.

Beneficial effects of the technical solutions provided in the embodiments of the present invention are as follows:

A controller determines a detection path, and controls each switch on the detection path to obtain a detection packet; after determining that the obtained detection packet matches a prestored flow table entry, each switch adds OAM information to the successfully matched detection packet according to the flow table entry prestored in each switch; and then the controller obtains a termination detection packet obtained after each switch adds the OAM information to the obtained detection packet, and determines link quality according to the termination detection packet. Each switch on a detection path does not need to use a corresponding link quality detection protocol to detect link quality, and only needs to add OAM information to an obtained detection packet according to a prestored flow table entry. In this way, not only a structure of each switch can be simplified, but also operations of each switch are simplified. In addition, a controller does not need to interact with each switch. Therefore, service processing efficiency can be improved.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

To make the objectives, technical solutions, and advantages of the present invention clearer, the following further describes the embodiments of the present invention in detail with reference to the accompanying drawings.

With rapid development of network technologies, during current network deployment, there are many complex network elements, such as a router, a gateway, a switch, a firewall, and various types of servers. These network elements that implement various network functions generally include respective independent control modules, and these distributed control modules make network deployment extremely complex. On this basis, to modify a control function or introduce a new feature, the multiple network elements need to be upgraded or replaced. To improve network deployment flexibility and manageability, advantages of an SDN-based network element management method are increasingly prominent. During SDN-based network deployment, a control function and a forwarding function of a network element may be decoupled, and a network element in a network is divided into two parts: a control plane and a forwarding plane. Control planes are generally deployed centrally, and forwarding planes are generally deployed on multiple physical devices in a distributed manner according to an actual requirement. The control plane controls the forwarding plane to implement various network functions, such as routing and exchanging. At present, SDN is widely used in a data center network and a telecommunications network.

Figure 1:
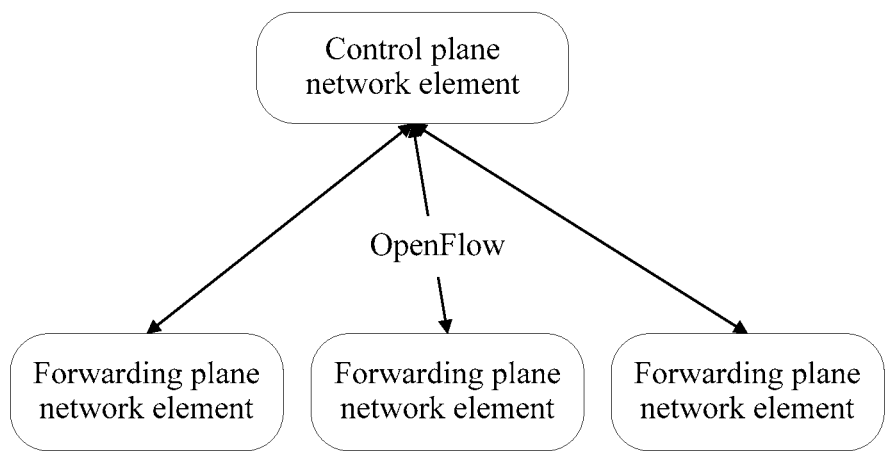
FIG. 1 is a schematic diagram of an SDN network architecture according to an embodiment of the present invention.

As shown in FIG. 1, FIG. 1 is a schematic diagram of an SDN network architecture. Communication between a control plane network element and forwarding plane network elements is implemented by using the OpenFlow (OpenFlow) protocol. The OpenFlow protocol is currently a mainstream SDN-based control protocol between a control plane network element and a forwarding plane network element. In the OpenFlow protocol, a control plane network element is referred to as an OpenFlow Controller (OpenFlow controller, hereinafter referred to as controller), and a forwarding plane network element is referred to as an OpenFlow Switch (OpenFlow switch, hereinafter referred to as switch). For ease of description, in the embodiments of the present invention, that a control plane network element and a forwarding plane network element are respectively a controller and a switch is used as an example to describe the method provided in the embodiments of the present invention. However, during specific implementation, a communications protocol between a control plane network element and a forwarding plane network element is not merely limited to the OpenFlow protocol, and may be another protocol. The embodiments of the present invention set no specific limitation thereto. In addition, the embodiments of the present invention set no limitation to a type of a network between a control plane network element and a forwarding plane network element, and a type of a network between forwarding plane network elements. During specific implementation, the network type includes but is not limited to the Ethernet protocol, IP (Internet Protocol, Internet Protocol), the MPLS (Multi-Protocol Label Switching, Multiprotocol Label Switching) protocol, and the like.

Figure 2:
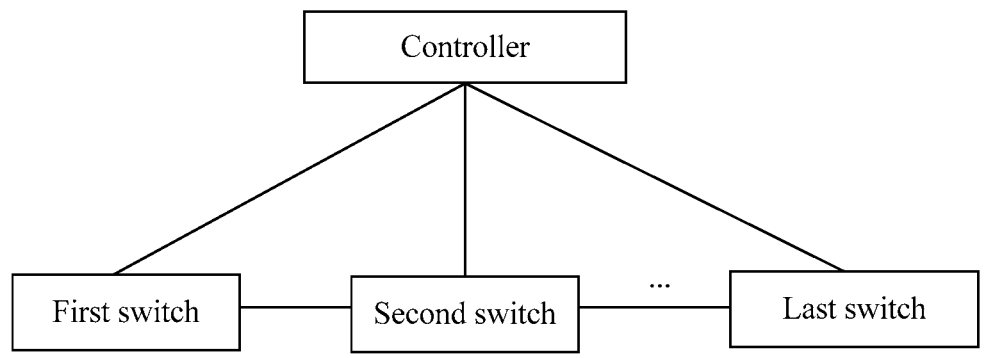
FIG. 2 is a schematic diagram of an implementation environment used in a link quality detection method according to another embodiment of the present invention.

As shown in FIG. 2, FIG. 2 shows a schematic diagram of an implementation environment used in a link quality detection method according to an embodiment of the present invention. The implementation environment includes a controller 201 and at least one switch 202.

The controller 201 mainly controls behavior of each switch 202 by using a flow table entry. The controller 201 predetermines a packet and an operation performed on the packet, formulates a flow table entry corresponding to each switch 202, and then delivers, to each switch 202, the flow table entry corresponding to each switch 202. As shown in Table 1, content of the flow table entry includes Match Fields (Match Fields), Priority (Priority), Counters (Counters), Instructions (Instructions), Timeouts (Timeouts), and Cookies (Cookie). For ease of understanding of the present invention, the following describes the Match Fields and the Instructions in the flow table entry.

TABLE 1

| Match Fields | Priority | Counters | Instructions | Timeouts | Cookies |
| --- | --- | --- | --- | --- | --- |

The Match Fields refer to match information such as various packet header fields and ingress port numbers with specific values. The packet header fields are, for example, 5-tuple (a source IP address, a destination IP address, a protocol type, a source port number, and a destination port number of an IP packet), and various packet header fields in an Ethernet frame header, such as a source MAC (Medium Access Control, Medium Access Control) address, and a destination MAC address. The match herein may be exact match, or may be mask match. For example, Match (SRC IP=1.1.1.1) indicates performing exact matching on a source IP address of a packet, and only a packet whose source IP address is 1.1.1.1 can be successfully matched; Match (SRC IP/16=1.1.0.0) indicates performing matching on first 16 bits of an IP address, and all packets whose source IP addresses are on a network segment 1.1.0.0/16 can be successfully matched.

There are many types of instructions in a flow table entry. For example, the instructions may include an action instruction (Action instruction), a pipeline control instruction (Goto-Table instruction), a measurement instruction (Meter instruction), and a write-metadata instruction (Write-Metadata instruction). Action instructions in the OpenFlow are classified into two broad categories. One broad category is an action to be immediately executed, and a corresponding instruction is Apply-Actions; the other broad category is an action that is first stored in an action set and is not executed until a pipeline ends. An instruction for writing an action into an action set is Write-Actions, and an instruction for clearing all actions from an action set is Clear-Actions. An action has many types regardless of whether the action is an action to be immediately executed or an action stored in an action set. For example, the action includes an action that instructs how to process a packet, such as forwarding, discarding, modifying a packet header, encapsulation, decapsulation, sending the packet to a controller, or a Set-Queue instruction (Set-Queue instruction). The Goto-Table instruction instructs a packet to jump between flow tables, that is, jump from a flow table to another flow table. The Meter instruction instructs to use a Meter table to perform QoS (Quality of Service, quality of service) processing on a packet.

Each switch 202 receives and stores the flow table entry corresponding to each switch 202, and performs matching on an obtained packet according to a match field in the prestored flow table entry, and if the matching succeeds, executes an instruction included in the flow table entry, so as to implement various kinds of packet processing.

Each switch 202 may include one or more flow tables. Matching is performed on the data packet starting from the first flow table, and if the matching succeeds, an instruction in the successfully matched flow table entry is executed. If the flow table entry includes an instruction that instructs the packet to jump to another flow table, the packet jumps to the another flow table and match processing continues. If the matching fails, the packet is processed according to a Table-Miss entry. For example, the packet may be discarded or transmitted to the controller for processing. The Table-Miss entry is a special flow table entry in an OpenFlow flow table, and the flow table entry has no match field, that is, the flow table entry can successfully match any packet, has a lowest match priority, and is used to instruct how to process a packet that fails to match all other flow table entries in the flow table. If no Table-Miss entry exists, how to process the packet is determined according to a flow table attribute. For example, the flow table attribute may be configured as discarding the packet or transmitting the packet to the controller for processing.

Figure 3:
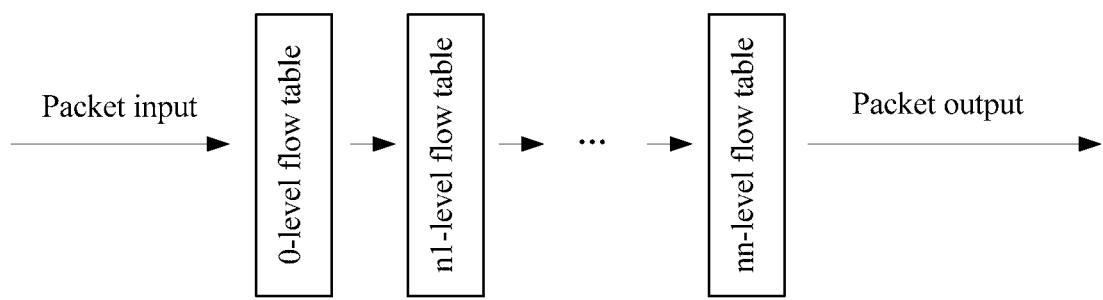
FIG. 3 is a schematic diagram of a process of transferring a packet between flow tables according to another embodiment of the present invention.

As shown in FIG. 3, FIG. 3 shows a schematic diagram of a process of transferring a packet between flow tables. An entire procedure of processing, in all flow tables, a packet that enters each switch 202 is called a pipeline (Pipeline). Metadata may be used to transfer information between all the flow tables. An ingress port (ingress port) indicates an ID of a port, of the switch, that receives the packet. Actions include two types, one is an action to be immediately executed, and the other is an action that is executed when the pipeline ends. The latter action is stored in an action set (Action Set), and is executed when the pipeline ends. Therefore, when the packet jumps between the flow tables, four pieces of information: packet content, an ingress port, metadata, and an action set are correspondingly transferred between the flow tables.

Figure 4:
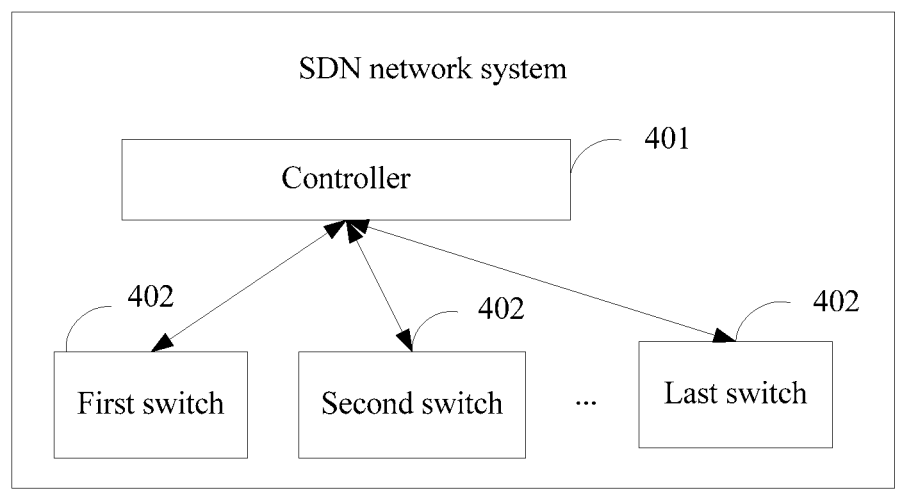
FIG. 4 is a schematic structural diagram of an SDN network system according to another embodiment of the present invention.

With reference to the brief description of the controller and the switch, by using the link quality detection method provided in the embodiments of the present invention, a controller 201 determines a detection path, generates a flow table entry corresponding to each switch 202 included in the detection path, and then sends the flow table entry corresponding to each switch 202 on the detection path to each switch. During link quality detection, the controller 201 controls each switch 202 on the detection path to obtain a detection packet; after determining that the obtained detection packet matches a flow table entry prestored in each switch 202, each switch 202 adds OAM information to the successfully matched detection packet according to the flow table entry prestored in each switch 202, and sends, to a next switch on the detection path or the controller, the detection packet to which the OAM information is added; and finally, the controller 201 obtains a termination detection packet obtained after each switch 202 adds the OAM information to the obtained detection packet, and determines link quality according to the termination detection packet. For a specific link quality detection method, refer to the following embodiments:

FIG. 4 is a schematic structural diagram of an SDN network system according to an example of an embodiment. As shown in FIG. 4, the system includes a controller 401 and at least one switch 402.

The controller 401 is configured to: determine a detection path; control each switch on the detection path to obtain a detection packet, so that after determining that the obtained detection packet matches a flow table entry prestored in each switch, each switch adds OAM information to the successfully matched detection packet according to the flow table entry prestored in each switch; obtain a termination detection path obtained after each switch adds the OAM information to the obtained detection packet; and determine link quality according to the termination detection packet.

Each switch 402 of the at least one switch is configured to: obtain the detection packet, perform matching on the obtained detection packet, add the OAM information to the successfully matched detection packet according to the corresponding flow table entry, and then send, to a next switch on the detection path or the controller, the detection packet to which the OAM information is added.

According to the system provided in this embodiment of the present invention, a controller determines a detection path, and controls each switch on the detection path to obtain a detection packet; after determining that the obtained detection packet matches a prestored flow table entry, each switch adds OAM information to the successfully matched detection packet according to the flow table entry prestored in each switch; and then the controller obtains a termination detection packet obtained after each switch adds the OAM information to the obtained detection packet, and determines link quality according to the termination detection packet. Each switch on a detection path does not need to use a corresponding link quality detection protocol to detect link quality, and only needs to add OAM information to an obtained detection packet according to a prestored flow table entry. In this way, not only a structure of each switch can be simplified, but also operations of each switch are simplified. In addition, a controller does not need to interact with each switch. Therefore, service processing efficiency can be improved.

Figure 5:
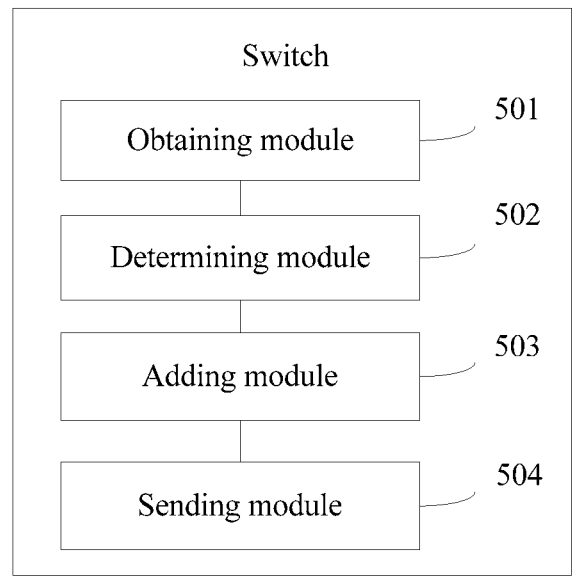
FIG. 5 is a schematic structural diagram of a switch according to another embodiment of the present invention.

FIG. 5 is a schematic structural diagram of a switch according to an example of an embodiment. The switch is any switch in the system shown in FIG. 4, and the switch is configured to execute functions executed by each switch in link quality detection methods provided in corresponding embodiments in the following FIG. 7 to FIG. 15A and FIG. 15B. As shown in FIG. 5, the switch includes:

an obtaining module 501, configured to obtain a detection packet, where the obtained detection packet comes from a controller or a previous switch on a detection path determined by a controller;

a determining module 502, configured to determine whether the obtained detection packet matches a locally prestored flow table entry;

an adding module 503, configured to add OAM information to the obtained detection packet according to the locally prestored flow table entry when the obtained detection packet matches the locally prestored flow table entry; and a sending module 504, configured to send, to a next switch on the detection path, the detection packet to which the OAM information is added, until the last switch on the detection path adds OAM information to an obtained detection packet according to a prestored flow table entry, to obtain a termination detection packet, and sends the termination detection packet to the controller, and the controller determines link quality according to the termination detection packet.

Optionally, the obtaining module 501 is configured to:

when the local switch is the first switch on the detection path, receive an initial detection packet sent by the controller, and use the received initial detection packet as the obtained detection packet; or receive a detection packet generation instruction sent by the controller, generate an initial detection packet according to the detection packet generation instruction, and use the generated initial detection packet as the obtained detection packet; or when the local switch is not the first switch on the detection path, receive a detection packet to which a previous switch on the detection path adds OAM information, and use the received detection packet to which the previous switch adds the OAM information as the obtained detection packet.

Optionally, the switch further includes:

a receiving module, configured to receive and store the flow table entry sent by the controller, where the flow table entry is used to instruct the local switch to: perform matching on the obtained detection packet, add the OAM information to the successfully matched detection packet according to the locally prestored flow table entry to obtain the detection packet to which the local OAM information is added, and then send, to a next switch on the detection path or the controller by using an egress port specified in the flow table entry, the detection packet to which the local OAM information is added.

Optionally, the detection packet obtained by the obtaining module 501 carries a detection path ID, and the determining module 502 includes:

a parsing unit, configured to parse a packet header field and the detection path ID in the obtained detection packet; and a determining unit, configured to determine, according to at least one piece of information of the packet header field and the detection path ID in the obtained detection packet, whether the obtained detection packet matches the locally prestored flow table entry.

Optionally, the OAM information added by the local switch to the detection packet obtained by the obtaining module 501 includes at least one piece of information of used bandwidth of an ingress port, idle bandwidth of an ingress port, used bandwidth of an egress port, idle bandwidth of an egress port, a total quantity of detection packets, a detection packet receiving time stamp, and a detection packet sending time stamp.

The switch provided in this embodiment of the present invention obtains a detection packet, and after determining that the obtained detection packet matches a prestored flow table entry, adds OAM information to the successfully matched detection packet according to the locally prestored flow table entry; and a controller obtains a termination detection packet obtained after each switch adds the OAM information to the obtained detection packet, and the controller determines link quality according to the termination detection packet. A switch does not need to use a corresponding link quality detection protocol to detect link quality, and only needs to add OAM information to an obtained detection packet according to a prestored flow table entry. In this way, not only a structure of the switch can be simplified, but also operations of the switch are simplified. In addition, a controller does not need to interact with each switch. Therefore, service processing efficiency can be improved.

Figure 6:
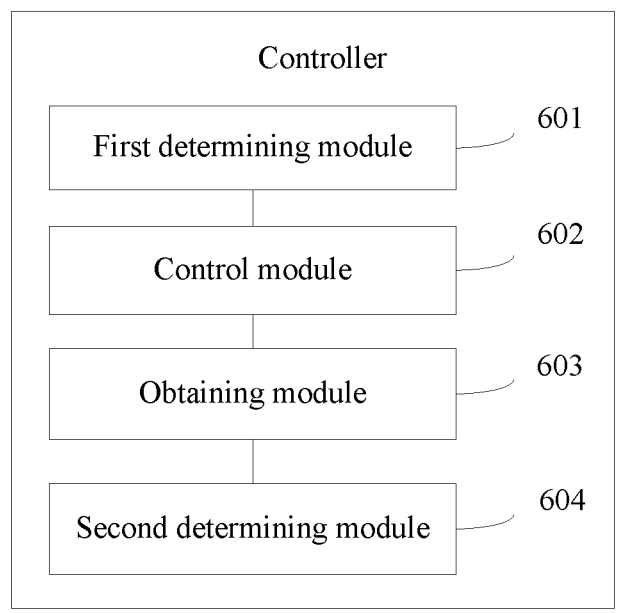
FIG. 6 is a schematic structural diagram of a controller according to another embodiment of the present invention.

FIG. 6 is a schematic structural diagram of a controller according to an example of an embodiment. The controller is the controller in the system shown in FIG. 4, and the controller is configured to execute functions executed by a controller in link quality detection methods provided in corresponding embodiments in the following FIG. 7 to FIG. 15A and FIG. 15B. As shown in FIG. 6, the controller includes:

a first determining module 601, configured to determine a detection path, where the detection path includes at least one switch;

a control module 602, configured to control each switch on the detection path to obtain a detection packet, so that after determining that the obtained detection packet matches a flow table entry prestored in each switch, each switch adds OAM information to the successfully matched detection packet according to the flow table entry prestored in each switch;

an obtaining module 603, configured to obtain a termination detection packet obtained after each switch adds the OAM information to the obtained detection packet; and a second determining module 604, configured to determine link quality according to the termination detection packet.

Optionally, the controller further includes:

a sending module, configured to send, to each switch on the detection path, the flow table entry corresponding to each switch, where the flow table entry corresponding to each switch is used to instruct each switch to: perform matching on the obtained detection packet, add the OAM information to the successfully matched detection packet according to the flow table entry prestored in each switch, and then send, to a next switch on the detection path or the controller by using an egress port specified in the flow table entry corresponding to each switch, the detection packet to which the OAM information is added.

Optionally, the first determining module 601 is configured to determine the detection path according to network configuration information; or generate a detection path according to network topology information, and use the generated detection path as the determined detection path.

Optionally, the control module 602 is configured to:

if the switch is the first switch on the detection path, control sending an initial detection packet to the first switch, so that the first switch uses the received initial detection packet as the obtained detection packet; or control sending a detection packet generation instruction to the first switch, so that the first switch generates an initial detection packet according to the detection packet generation instruction, and uses the generated initial detection packet as the obtained detection packet; or if the switch is not the first switch on the detection path, control the switch to: receive a detection packet that is sent by a previous switch on the detection path and to which the previous switch adds OAM information, and use the received detection packet to which the previous switch adds the OAM information as the obtained detection packet.

Optionally, the control module 602 is configured to control periodically sending the initial detection packet to the first switch; and the second determining module 604 is configured to: determine whether no termination detection packet corresponding to each initial detection packet is received within a preset quantity of periods; and if determining that no termination detection packet corresponding to each initial detection packet is received within the preset quantity of periods, determine that the detection path is faulty.

Optionally, the initial detection packet carries a generation time stamp of the initial detection packet and a packet sequence number of the initial detection packet. The controller further includes:

a recording module, configured to record a total quantity of received termination detection packets and a receiving time stamp of the termination detection packet; where the second determining module 604 is configured to determine the link quality according to at least one piece of information of the generation time stamp of the initial detection packet, the packet sequence number of the initial detection packet, the OAM information that is carried in the termination detection packet and added by each switch, the total quantity of termination detection packets, and the receiving time stamp of the termination detection packet.

The controller provided in this embodiment of the present invention determines a detection path, and controls each switch on the detection path to obtain a detection packet, so that after determining that the obtained detection packet matches a prestored flow table entry, each switch adds OAM information to the successfully matched detection packet according to the flow table entry prestored in each switch; and then the controller obtains a termination detection packet obtained after each switch adds the OAM information to the obtained detection packet, and determines link quality according to the termination detection packet. Each switch on a detection path does not need to use a corresponding link quality detection protocol to detect link quality, and only needs to add OAM information to an obtained detection packet according to a prestored flow table entry. In this way, not only a structure of each switch can be simplified, but also operations of each switch are simplified. In addition, a controller does not need to interact with each switch. Therefore, service processing efficiency can be improved.

Figure 7:
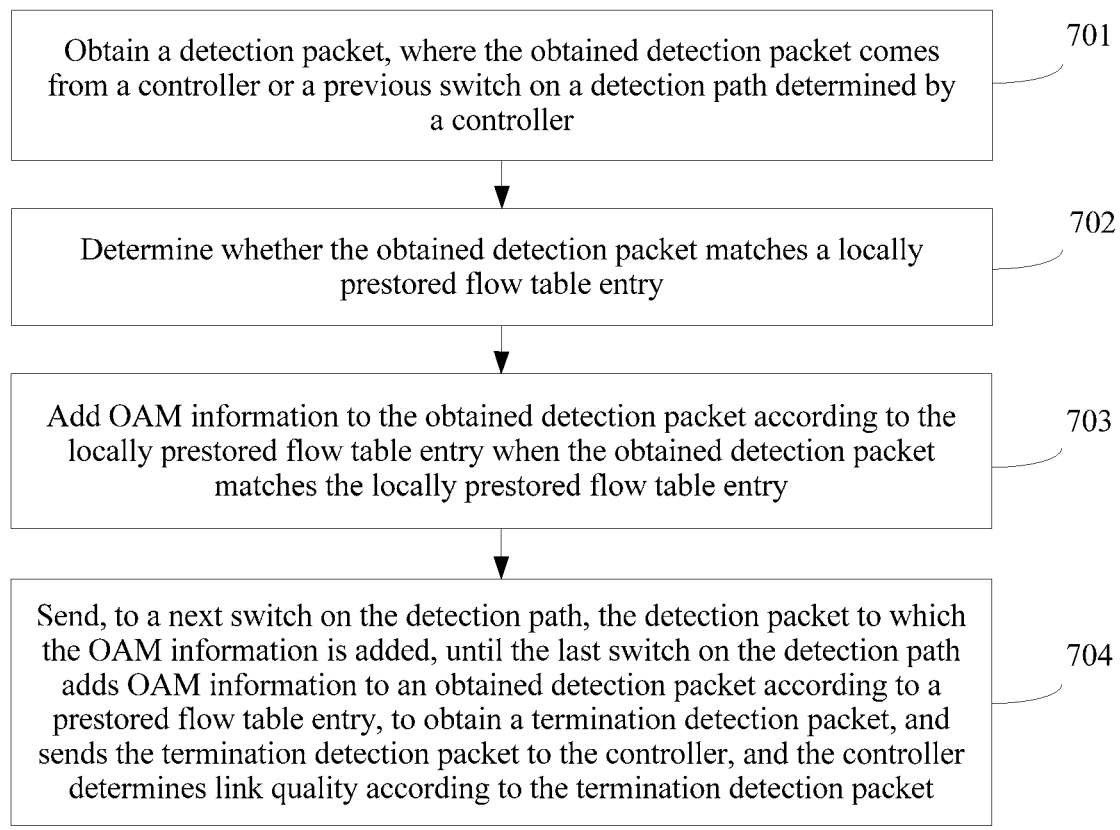
FIG. 7 is a flowchart of a link quality detection method according to another embodiment of the present invention.

FIG. 7 is a flowchart of a link quality detection method according to an example of an embodiment. That any switch executes the method provided in this embodiment of the present invention is used as an example. As shown in FIG. 7, a procedure of the method provided in this embodiment of the present invention includes the following steps.

701. Obtain a detection packet, where the obtained detection packet comes from a controller or a previous switch on a detection path determined by a controller.

Optionally, the obtaining a detection packet includes:

when the local switch is the first switch on the detection path, receiving an initial detection packet sent by the controller, and using the received initial detection packet as the obtained detection packet; or receiving a detection packet generation instruction sent by the controller, generating an initial detection packet according to the detection packet generation instruction, and using the generated initial detection packet as the obtained detection packet; or when the local switch is not the first switch on the detection path, receiving a detection packet to which a previous switch on the detection path adds OAM information, and using the received detection packet to which the previous switch adds the OAM information as the obtained detection packet.

702. Determine whether the obtained detection packet matches a locally prestored flow table entry.

Optionally, before the determining whether the obtained detection packet matches a locally prestored flow table entry, the method further includes:

receiving and storing the flow table entry sent by the controller, where the flow table entry is used to instruct the local switch to: perform matching on the obtained detection packet, add the OAM information to the successfully matched detection packet according to the locally prestored flow table entry to obtain the detection packet to which the local OAM information is added, and then send, to a next switch on the detection path or the controller by using an egress port specified in the flow table entry, the detection packet to which the local OAM information is added.

Optionally, the obtained detection packet carries a detection path identity (ID), and the determining whether the obtained detection packet matches a locally prestored flow table entry includes:

parsing a packet header field and the detection path ID in the obtained detection packet; and determining, according to at least one piece of information of the packet header field and the detection path ID in the obtained detection packet, whether the obtained detection packet matches the locally prestored flow table entry.

703. Add OAM information to the obtained detection packet according to the locally prestored flow table entry when the obtained detection packet matches the locally prestored flow table entry.

Optionally, the OAM information added by the local switch to the obtained detection packet includes at least one piece of information of used bandwidth of an ingress port, idle bandwidth of an ingress port, used bandwidth of an egress port, idle bandwidth of an egress port, a total quantity of detection packets, a detection packet receiving time stamp, and a detection packet sending time stamp.

704. Send, to a next switch on the detection path, the detection packet to which the OAM information is added, until the last switch on the detection path adds OAM information to an obtained detection packet according to a prestored flow table entry, to obtain a termination detection packet, and sends the termination detection packet to the controller, and the controller determines link quality according to the termination detection packet.

According to the method provided in this embodiment of the present invention, a detection packet is obtained, and after it is determined that the obtained detection packet matches a prestored flow table entry, OAM information is added to the successfully matched detection packet according to the flow table entry prestored in each switch; and a controller obtains a termination detection packet obtained after each switch adds the OAM information to the obtained detection packet, and the controller determines link quality according to the termination detection packet. A switch does not need to use a corresponding link quality detection protocol to detect link quality, and only needs to add OAM information to an obtained detection packet according to a prestored flow table entry. In this way, not only a structure of the switch can be simplified, but also operations of the switch are simplified. In addition, a controller does not need to interact with each switch. Therefore, service processing efficiency can be improved.

Figure 8:
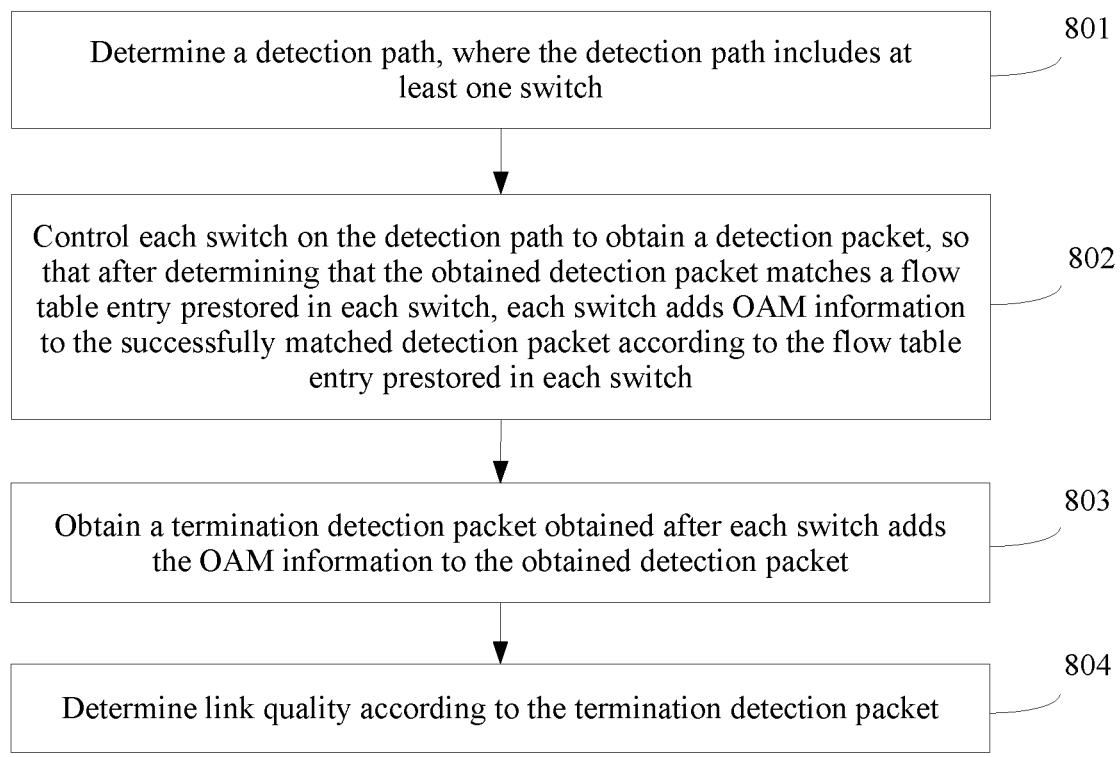
FIG. 8 is a flowchart of a link quality detection method according to another embodiment of the present invention.

FIG. 8 is a flowchart of a link quality detection method according to an example of an embodiment. That a controller executes the method provided in this embodiment of the present invention is used as an example. As shown in FIG. 8, a procedure of the method provided in this embodiment of the present invention includes the following steps.

801. Determine a detection path, where the detection path includes at least one switch.

Optionally, the determining a detection path includes:

determining the detection path according to network configuration information; or generating a detection path according to network topology information, and using the generated detection path as the determined detection path.

802. Control each switch on the detection path to obtain a detection packet, so that after determining that the obtained detection packet matches a flow table entry prestored in each switch, each switch adds OAM information to the successfully matched detection packet according to the flow table entry prestored in each switch.

Optionally, before the controlling each switch on the detection path to obtain a detection packet, the method further includes:

sending, to each switch on the detection path, the flow table entry corresponding to each switch, where the flow table entry corresponding to each switch is used to instruct each switch to: perform matching on the obtained detection packet, add the OAM information to the successfully matched detection packet according to the flow table entry prestored in each switch, and then send, to a next switch on the detection path or the controller by using an egress port specified in the flow table entry corresponding to each switch, the detection packet to which the OAM information is added.

Optionally, the controlling each switch on the detection path to obtain a detection packet includes:

if the switch is the first switch on the detection path, controlling sending an initial detection packet to the first switch, so that the first switch uses the received initial detection packet as the obtained detection packet; or controlling sending a detection packet generation instruction to the first switch, so that the first switch generates an initial detection packet according to the detection packet generation instruction, and uses the generated initial detection packet as the obtained detection packet; or if the switch is not the first switch on the detection path, controlling the switch to: receive a detection packet that is sent by a previous switch on the detection path and to which the previous switch adds OAM information, and use the received detection packet to which the previous switch adds the OAM information as the obtained detection packet.

803. Obtain a termination detection packet obtained after each switch adds the OAM information to the obtained detection packet.

804. Determine link quality according to the termination detection packet.

Optionally, the controlling sending an initial detection packet to the first switch includes:

controlling periodically sending the initial detection packet to the first switch.

The determining link quality according to the termination detection packet includes:

determining whether no termination detection packet corresponding to each initial detection packet is received within a preset quantity of periods; and if determining that no termination detection packet corresponding to each initial detection packet is received within the preset quantity of periods, determining that the detection packet is faulty.

Optionally, the initial detection packet carries a generation time stamp of the initial detection packet and a packet sequence number of the initial detection packet, and after the obtaining a termination detection packet obtained after each switch adds the OAM information to the obtained detection packet, the method further includes:

recording a total quantity of received termination detection packets and a receiving time stamp of the termination detection packet.

The determining link quality according to the termination detection packet includes:

determining the link quality according to at least one piece of information of the generation time stamp of the initial detection packet, the packet sequence number of the initial detection packet, the OAM information that is carried in the termination detection packet and added by each switch, the total quantity of termination detection packets, and the receiving time stamp of the termination detection packet.

According to the method provided in this embodiment of the present invention, a controller determines a detection path, and controls each switch on the detection path to obtain a detection packet, so that after determining that the obtained detection packet matches a prestored flow table entry, each switch adds OAM information to the successfully matched detection packet according to the flow table entry prestored in each switch; and then the controller obtains a termination detection packet obtained after each switch adds the OAM information to the obtained detection packet, and determines link quality according to the termination detection packet. Each switch on a detection path does not need to use a corresponding link quality detection protocol to detect link quality, and only needs to add OAM information to an obtained detection packet according to a prestored flow table entry. In this way, not only a structure of each switch can be simplified, but also operations of each switch are simplified. In addition, a controller does not need to interact with each switch. Therefore, service processing efficiency can be improved.

Figure 9:
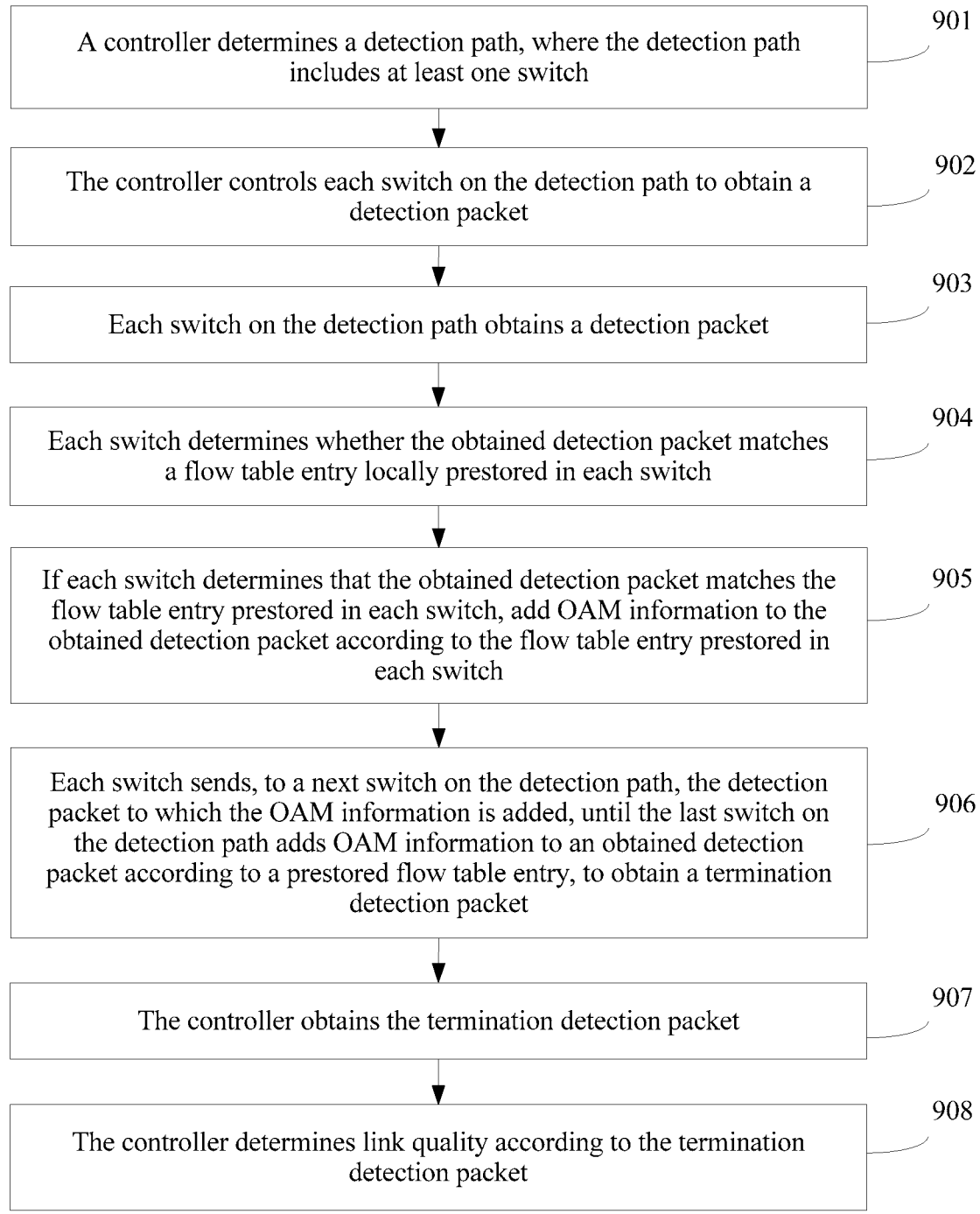
FIG. 9 is a flowchart of a link quality detection method according to another embodiment of the present invention.

FIG. 9 is a flowchart of a link quality detection method according to an example of an embodiment. In this embodiment of the present invention, the link quality detection method provided in this embodiment of the present invention is executed by means of interaction between a controller and each switch on a detection path. Referring to FIG. 9, a procedure of the method provided in this embodiment of the present invention includes the following steps.

901. A controller determines a detection path, where the detection path includes at least one switch.

There may be multiple manners in which the controller determines the detection path. During specific implementation, the multiple manners include but are not limited to the following two manners:

In a first manner, possible detection paths included in a network topology are preconfigured in the controller; therefore, during link quality detection, the controller may select a detection path according to a sequence of the preconfigured detection paths and perform detection, or randomly select a detection path and perform detection. Therefore, the controller may determine the detection path according to network configuration information.

In a second manner, the controller may determine a path, for detection, in a network topology according to a requirement; therefore, the controller may generate a detection path according to network topology information, and use the generated detection path as the determined detection path.

It should be noted that, to differentiate between detection paths in a network topology, each detection path in the network topology may be corresponding to a globally unique detection path ID. In this way, a detection path ID can not only be used to differentiate a detection path from another, but also help each switch on the detection path subsequently determine, according to the detection path ID, whether an obtained detection packet matches a locally prestored flow table entry.

Optionally, to enable each switch on the detection path to determine a to-be-executed operation, the controller needs to send, to each switch on the detection path, a flow table entry corresponding to each switch before detecting a link. The flow table entry corresponding to each switch is used to instruct each switch to: perform matching on an obtained detection packet, add OAM information to the successfully matched detection packet according to the flow table entry prestored in each switch, and then send, to a next switch on the detection path or the controller by using an egress port specified in the flow table entry corresponding to each switch, the detection packet to which the OAM information is added.

For example, content of a flow table entry that is corresponding to a switch on the detection path and sent by the controller to the switch may be: Match (EthType=X, Path-ID=1), Instructions (Apply-Actions (Append (Recv-BW-Used), Output (Port 2))). The content of the flow table entry instructs the switch that receives the flow table entry to add Recv-BW-Used (Recv-BW-Used) to a tail of a detection packet whose Ethernet protocol type is X (EthType=X) and whose detection path ID (Path-ID) is 1, and then send the detection packet by using a port 2 (Port 2). Append is a new Action defined in OpenFlow in this embodiment of the present invention, and instructs to add specified information to a packet tail, and Recv-BW-Used indicates used bandwidth of an ingress port of the switch.

This embodiment of the present invention sets no specific limitation to a manner in which the controller sends, to each switch, the flow table entry corresponding to each switch.

It should be noted that the step in which the controller sends, to each switch on the detection path, the flow table entry corresponding to each switch is a step prior to detecting link quality, but is not a step that needs to be executed each time link quality is being detected. It only needs to be ensured that the flow table entry corresponding to each switch on the detection path has been sent to each switch when link quality is being detected.

902. The controller controls each switch on the detection path to obtain a detection packet.

The controller may control switches in different locations on the detection path to obtain a detection packet in different manners. Therefore, when the controller controls each switch on the detection path to obtain a detection packet, a location of the switch on the detection path needs to be referenced. Specifically, that the controller controls each switch to obtain a detection packet includes but is not limited to the following:

if the switch is the first switch on the detection path, the controller may control sending an initial detection packet to the first switch, so that the first switch uses the received initial detection packet as the obtained detection packet; or the controller may control sending a detection packet generation instruction to the first switch, so that the first switch generates an initial detection packet according to the detection packet generation instruction, and uses the generated initial detection packet as the obtained detection packet; or if the switch is not the first switch on the detection path, the controller may control the switch to: receive a detection packet that is sent by a previous switch on the detection path and to which the previous switch adds OAM information, and use the received detection packet to which the previous switch adds the OAM information as the obtained detection packet.

During link quality detection in this embodiment of the present invention, the controller needs to control each switch on the detection path to add, to a successfully matched detection packet, OAM information corresponding to each switch. For ease of description and ease of differentiating a detection packet obtained by the first switch on the detection path from a detection packet obtained by another switch on the detection path, in this embodiment of the present invention and subsequent embodiments, a detection packet obtained by the first switch is referred to as an initial detection packet.

If the switch is the first switch on the detection path, this embodiment of the present invention sets no specific limitation to a manner in which the controller controls sending the initial detection packet to the first switch. During specific implementation, the controller may use a Packet-Out message (Packet-Out message) in the OpenFlow protocol to send the initial detection packet to the switch. In addition, the controller may further send the initial detection packet to the first switch with reference to a network type and a connection port between the controller and the first switch. For example, if a type of a network between the controller and the first switch is the Ethernet, and the controller is connected to a port 0 of the first switch by using a port 0, the controller sends the initial detection packet in an Ethernet packet format to the port 0 of the first switch by using the port 0.

This embodiment of the present invention sets no specific limitation to a manner in which the controller controls sending the detection packet generation instruction to the first switch. During specific implementation, when a new detection packet generation instruction is added to an interface protocol between the controller and the switch, for example, a new detection packet generation instruction is added to the OpenFlow protocol, and the detection packet generation instruction is used to instruct the switch to generate an initial detection packet, the controller may send the detection packet generation instruction to the first switch in a manner of an independent instruction.

If the switch is another switch other than the first switch on the detection path, the controller controls the another switch to: receive a detection packet that is sent by a previous switch on the detection path and to which OAM information is added, and use the received detection packet to which the previous switch adds the OAM information as the obtained detection packet. This includes but is not limited to: controlling a previous switch to connect to a next switch by using a corresponding port, and instructing the previous switch to send, to the next switch by using the port connected to the next switch, a detection packet to which OAM information is added, so that the next switch receives, by using a port connected to the previous switch, the detection packet that is sent by the previous switch and to which the OAM information is added.

903. Each switch on the detection path obtains a detection packet.

Because the switches are located in different locations on the detection path, manners in which the switches obtain detection packets are different. Therefore, a manner of obtaining a detection packet needs to be determined with reference to a location of a switch on the detection path. Specifically, obtaining a detection packet includes but is not limited to the following:

if a local switch is the first switch on the detection path, the first switch may receive an initial detection packet sent by the controller, and use the received initial detection packet as the obtained detection packet; or the first switch may receive a detection packet generation instruction sent by the controller, generate an initial detection packet according to the detection packet generation instruction, and use the generated initial detection packet as the obtained detection packet; or if the local switch is not the first switch on the detection path, the local switch may receive a detection packet to which a previous switch on the detection path adds OAM information, and use the received detection packet to which the previous switch adds the OAM information as the obtained detection packet.

Specifically, if the local switch is the first switch on the detection path, this embodiment of the present invention sets no specific limitation to a manner in which the first switch receives the initial detection packet sent by the controller. During specific implementation, if the controller sends the initial detection packet to the switch by using a Packet-Out message (Packet-Out message) in the OpenFlow protocol, the first switch receives the Packet-Out message to receive the initial detection packet sent by the controller. In addition, the first switch may further receive the initial detection packet with reference to a network type and a connection port between the first switch and the controller. For example, if a type of a network between the controller and the first switch is the Ethernet, and the controller and the first switch are connected by using a port 0 of the controller and a port 0 of the first switch, the controller may send an initial detection packet of an Ethernet packet format to the first switch by using the port 0, and the first switch receives, by using the port 0 connected to the controller, the initial detection packet of the Ethernet packet format sent by the controller.

This embodiment of the present invention sets no specific limitation to a manner in which the first switch receives the detection packet generation instruction sent by the controller. During specific implementation, if a new detection packet generation instruction is added to an interface protocol between the controller and the switch to instruct the first switch to generate the initial detection packet, and the controller sends the detection packet generation instruction to the first switch in a manner of an independent instruction, the first switch may receive the independent instruction sent by the controller, to receive the detection packet generation instruction.

In addition, when controlling the first switch to generate an initial detection packet, by using the detection packet generation instruction, the controller may further control the switch to periodically generate an initial detection packet, control the switch to generate a preset quantity of initial detection packets, and the like.

This embodiment of the present invention sets no specific limitation to specific content of the detection packet generation instruction. For example, the controller may send the following detection packet generation instruction to the first switch to instruct the first switch to generate an initial detection packet: PacketGenerate(Type=ETH, Dst MAC=MAC1, Src MAC=MAC0, Eth Type=X, Path-ID=1, T=10 s, Number=100). PacketGenerate in this example is the detection packet generation instruction. The detection packet generation instruction instructs the switch to generate an Ethernet packet (Type=ETH), a destination MAC address of the packet is MAC1, a source MAC address is MAC0, an Ethernet protocol type is X, a detection path ID (Path-ID) is 1, a generation period T is 10 s (second), and a total of 100 (Number=100) initial detection packets are generated.

Further, if the local switch is not the first switch on the detection path, this embodiment of the present invention sets no limitation to a manner in which the local switch receives the detection packet to which the previous switch on the detection path adds the OAM information. During specific implementation, the receiving needs to be implemented with reference to a network type and a connection port between the local switch and the previous switch on the detection path. For example, if a type of a network between the local switch and the previous switch is the Ethernet, and the local switch is connected to a port 2 of the previous switch by using a port 1, the local switch receives, by using the port 1, a detection packet of an Ethernet format that is sent by the previous switch by using the port 2 and to which the previous switch adds OAM information.

904. Each switch determines whether the obtained detection packet matches a flow table entry locally prestored in each switch.

To determine whether to process the received detection packet, after obtaining the detection packet, each switch needs to determine whether the obtained detection packet matches the flow table entry locally prestored in each switch.

This embodiment of the present invention sets no specific limitation to a manner in which each switch determines whether the obtained detection packet matches the flow table entry locally prestored in each switch. During specific implementation, for each detection path determined by the controller, if each detection path is corresponding to a globally unique detection path ID, for switches on different detection paths, different instructions or different action sets may exist. On this basis, a detection packet transmitted between the controller and a switch may carry a detection path ID. Therefore, that each switch determines whether the obtained detection packet matches the flow table entry locally prestored in each switch includes but is not limited to: parsing a packet header field and the detection path ID in the obtained detection packet, and determining, according to at least one piece of information of the packet header field and the detection path ID in the obtained detection packet, whether the obtained detection packet matches the locally prestored flow table entry.

This embodiment of the present invention sets no specific limitation to a manner of carrying a detection path ID in a detection packet. During specific implementation, when the controller controls the first switch to obtain an initial detection packet, a detection path ID may be added to the initial detection packet. When the first switch receives the initial detection packet sent by the controller to obtain a detection packet, the detection path ID may be added by the controller to the initial detection packet; when the first switch receives a detection packet generation instruction sent by the controller, to generate the initial detection packet, the detection path ID may be sent by the controller to the first switch, and added by the first switch to the initial detection packet. For ease of description, in subsequent embodiments of the present invention, information such as the detection path ID added by the controller to the initial detection packet is used as OAM information added by the controller.

This embodiment of the present invention sets no specific limitation to a manner of parsing the packet header field and the detection path ID in the obtained detection packet. A manner of determining, according to the at least one piece of information of the packet header field and the detection path ID in the obtained detection packet, whether the obtained detection packet matches the locally prestored flow table entry includes but is not limited to the following:

each switch may determine, according to the packet header field in the obtained detection packet, whether the obtained detection packet matches the flow table entry locally prestored in each switch; or may determine, according to the detection path ID in the obtained detection packet, whether the obtained detection packet matches the flow table entry locally prestored in each switch; or may determine, according to both the packet header field and the detection path ID in the obtained detection packet, whether the obtained detection packet matches the flow table entry locally prestored in each switch.

This embodiment of the present invention sets no specific limitation to a manner in which a switch determines, according to at least one piece of information of a packet header field and a detection path ID in an obtained detection packet, whether the obtained detection packet matches a flow table entry locally prestored in the switch.

For example, if the switch determines, according to the detection path ID, whether the obtained detection packet matches the flow table entry locally prestored in the switch, the switch may compare a detection path ID value carried in the obtained detection packet with a detection path ID value in the prestored flow table entry for implementation. If the detection path ID value carried in the detection packet obtained by the switch is consistent with the detection path ID value in the flow table entry prestored in the switch, the switch determines that the obtained detection packet matches the flow table entry locally prestored in the switch; if the detection path ID value carried in the detection packet obtained by the switch is inconsistent with the detection path ID value in the flow table entry locally prestored in the switch, the switch determines that the obtained detection packet does not match the locally prestored flow table entry.

For another example, if the switch determines, according to the packet header field in the obtained detection packet, whether the obtained detection packet matches the flow table entry locally prestored in the switch, the switch may compare a packet header field value in the obtained detection packet with a packet header field value in the flow table entry locally prestored in the switch for implementation. If the packet header field value in the detection packet obtained by the switch is consistent with the packet header field value in the flow table entry locally prestored in the switch, the switch determines that the obtained detection packet matches the flow table entry locally prestored in the switch; if the packet header field value in the detection packet obtained by the switch is inconsistent with the packet header field value in the flow table entry prestored in the switch, the switch determines that the obtained detection packet does not match the flow table entry locally prestored in the switch. The packet header field in the detection packet includes but is not limited to a source MAC address, a destination MAC address, an Ethernet packet protocol type, a source IP address, a destination IP address, a protocol type, a source port number, a destination port number, and the like.

905. If each switch determines that the obtained detection packet matches the flow table entry prestored in each switch, add OAM information to the obtained detection packet according to the flow table entry prestored in each switch.

This embodiment of the present invention sets no specific limitation to a manner in which each switch adds OAM information to the obtained detection packet according to the flow table entry prestored in each switch. During specific implementation, the Append instruction mentioned in the foregoing step 901 is referenced. If a corresponding flow table entry received by each switch includes the Append instruction, each switch adds, to a packet tail of the received detection packet, parameter information carried in the Append.

Optionally, the OAM information added by each switch to the obtained detection packet includes at least one piece of information of used bandwidth of an ingress port, idle bandwidth of an ingress port, used bandwidth of an egress port, idle bandwidth of an egress port, a total quantity of detection packets, a detection packet receiving time stamp, and a detection packet sending time stamp.

It should be noted that, to enable a next switch on the detection path or the controller to know which switch does a received detection packet comes from, the controller may control, by using a flow table entry, each switch to add an ID of each switch to the obtained detection packet.

906. Each switch sends, to a next switch on the detection path, the detection packet to which the OAM information is added, until the last switch on the detection path adds OAM information to an obtained detection packet according to a prestored flow table entry, to obtain a termination detection packet.

This embodiment of the present invention sets no specific limitation to a manner in which each switch sends, to a next switch on the detection path, the detection packet to which the OAM information is added. During specific implementation, a number of a port through which each switch sends the detection packet is specified in the flow table entry corresponding to each switch, and each switch sends the detection packet by using the port number, and may send, to a next switch on the detection path, the detection packet to which the OAM information is added.

907. The controller obtains the termination detection packet.

The controller needs to obtain the termination detection packet, so as to determine link quality according to the termination detection packet obtained after each switch adds the OAM information. A manner in which the controller obtains the termination detection packet includes but is not limited to the following: a corresponding flow table entry sent by the controller to the last switch on the detection path instructs the last switch to send, to the controller by using a specified port, the detection packet to which the OAM information is added. Therefore, the controller may obtain the termination detection packet by receiving the termination detection packet sent by the last switch on the detection path.

For example, content of the flow table entry that is corresponding to the last switch on the detection path and sent by the controller to the switch may be: Match (Dst MAC=MAC1, SRC MAC=MAC0), Instructions (Apply-Actions (Output (CONTROLLER))). The content of the flow table entry indicates that a detection packet whose destination MAC address is MAC1 and whose source MAC address is MAC0 is sent to the controller by using a Packet-In message. CONTROLLER is a special port defined in the OpenFlow protocol, and indicates that a packet is sent to the controller by using a Packet-In message.

908. The controller determines link quality according to the termination detection packet.

A manner in which the controller determines the link quality according to the termination detection packet may be determined with reference to specific content of the link quality that the controller needs to determine and specific content of the OAM information added by each switch to the obtained detection packet, where the adding is performed under an instruction of the controller. A specific manner of determining the link quality according to the termination detection packet is described in detail in subsequent embodiments, and details are not described herein. It should be noted that, by using the method provided in this embodiment of the present invention, not only link connectivity can be detected, but also a delay, jitter, bandwidth, a packet loss rate, and the like of a link can be detected.

Optionally, if the controller controls sending the initial detection packet to the first switch on the detection path to trigger a link detection process in step 902, when controlling sending the initial detection packet to the first switch, the controller may control periodically sending the initial detection packet to the first switch. In this case, when determining the link quality according to the termination detection packet, the controller may determine whether no termination detection packet corresponding to each initial detection packet is received within a preset quantity of periods, and if determining that no termination detection packet corresponding to each initial detection packet is received within the preset quantity of periods, determine that the detection path is faulty, that is, a disconnected node exists on the detection path.

Optionally, when the controller controls detecting link quality, if the controller controls sending the initial detection packet to the first switch on the detection path to trigger a link detection process in step 902, the controller may further add a generation time stamp of the initial detection packet and a packet sequence number of the initial detection packet to the initial detection packet. Because a moment when the controller generates the initial detection packet is extremely close to a moment when the controller sends the initial detection packet, the generation time stamp of the initial detection packet is a sending time stamp of the initial detection packet.

By adding the sequence number of the initial detection packet to the initial detection packet, the controller may collect statistics about a total quantity of initial detection packets that have been sent, so that the controller can determine a packet loss rate according to the total quantity of sent initial detection packets and a total quantity of subsequently received termination detection packets. By adding the sending time stamp of the initial detection packet to the initial detection packet, subsequently, the controller can determine a delay, jitter, and the like of the link according to the sending time stamp of the initial detection packet and a receiving time stamp of the termination detection packet.

With reference to the foregoing content, after obtaining the termination detection packet obtained after each switch adds the OAM information to the obtained detection packet, the controller may further record a total quantity of received termination detection packets and a receiving time stamp of the termination detection packet. In this case, that the controller determines link quality according to the termination detection packet includes: determining the link quality according to at least one piece of information of the generation time stamp of the initial detection packet, the packet sequence number of the initial detection packet, the OAM information that is carried in the termination detection packet and added by each switch, the total quantity of termination detection packets, and the receiving time stamp of the termination detection packet. Specific content in which the controller determines link connectivity and detects a delay, jitter, bandwidth, a packet loss rate, and the like of a link, according to the termination detection packet is specifically described in subsequent embodiments with examples, and details are not described herein.

According to the method provided in this embodiment of the present invention, a controller determines a detection path, and controls each switch on the detection path to obtain a detection packet; after determining that the obtained detection packet matches a prestored flow table entry, each switch adds OAM information to the successfully matched detection packet according to the flow table entry prestored in each switch; and then the controller obtains a termination detection packet obtained after each switch adds the OAM information to the obtained detection packet, and determines link quality according to the termination detection packet. Each switch on a detection path does not need to use a corresponding link quality detection protocol to detect link quality, and only needs to add OAM information to an obtained detection packet according to a prestored flow table entry. In this way, not only a structure of each switch can be simplified, but also operations of each switch are simplified. In addition, a controller does not need to interact with each switch. Therefore, service processing efficiency can be improved.

Figure 10A:
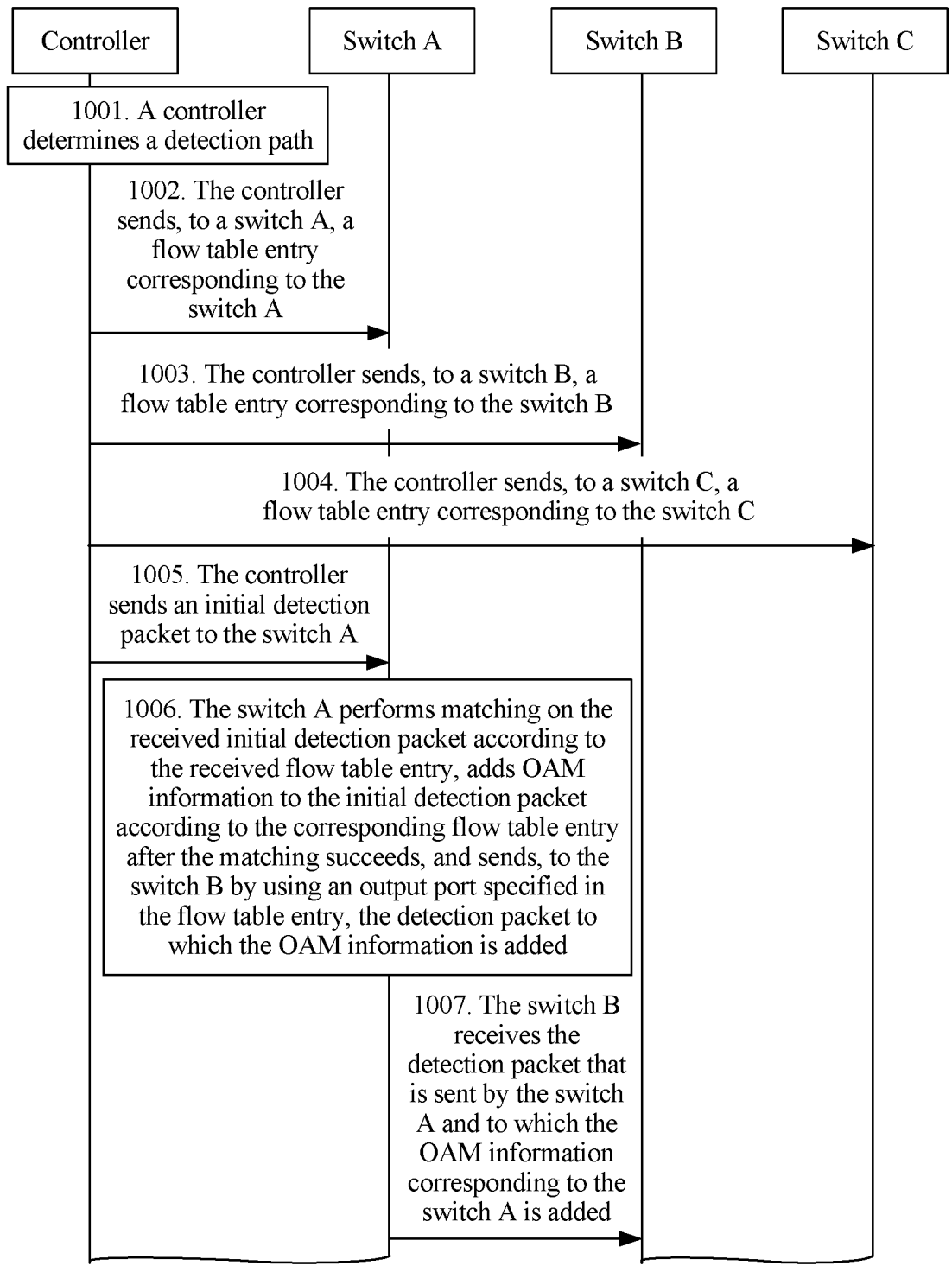
FIG. 10A and FIG. 10B are a flowchart of a link quality detection method according to another embodiment of the present invention.
Figure 10B:
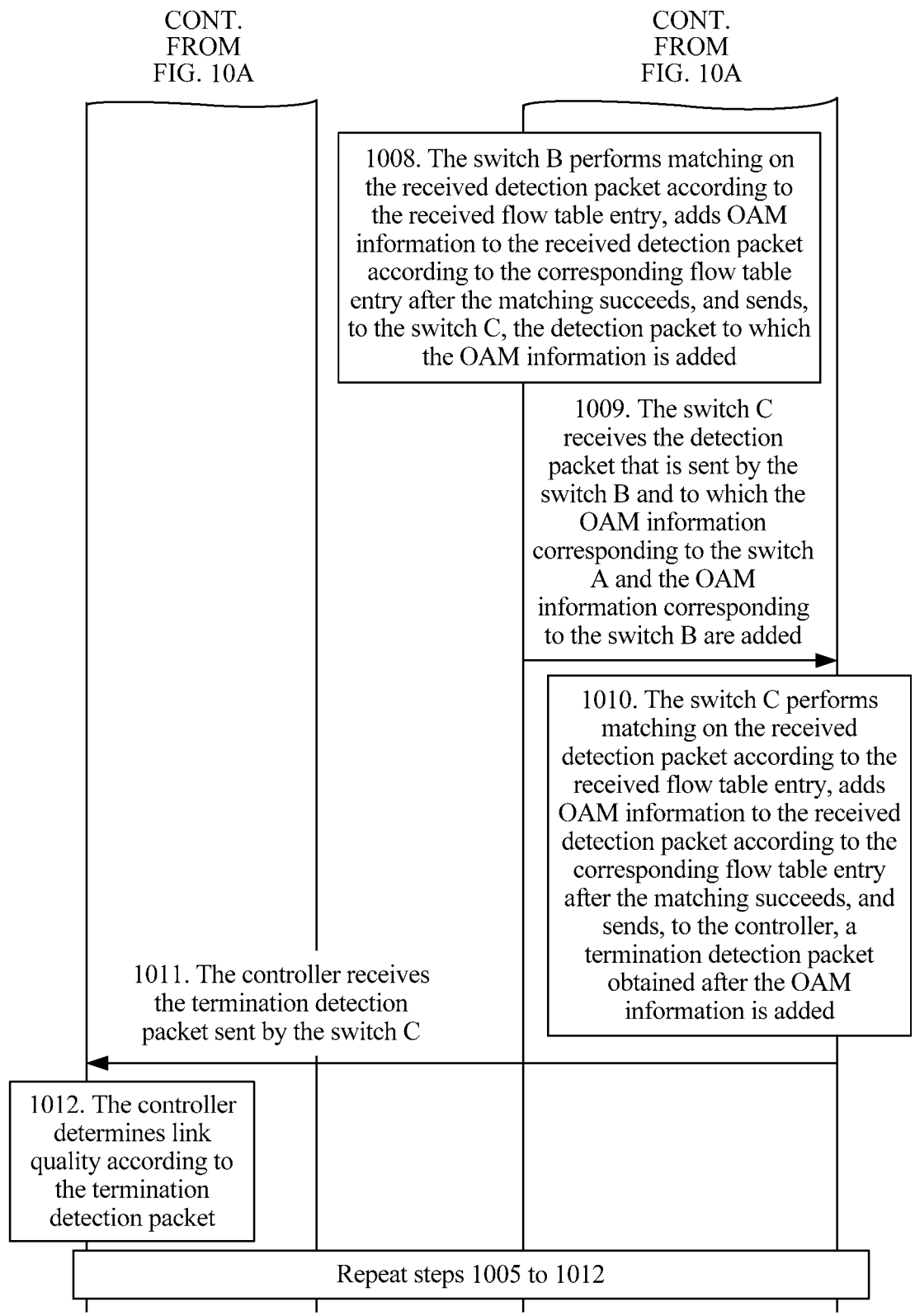

FIG. 10A and FIG. 10B are a flowchart of a link quality detection method according to an example of an embodiment. For ease of description of the link quality detection method provided in this embodiment of the present invention, that a detection path is a controller—a switch A—a switch B—a switch C—the controller is used as an example in this embodiment of the present invention. In addition, in this embodiment of the present invention, the controller sends an initial detection packet to the first switch on the detection path to trigger a link quality detection process.

Figure 11:
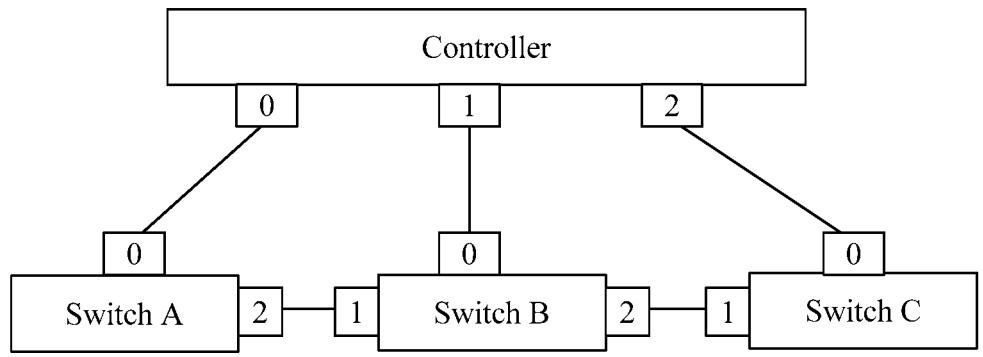
FIG. 11 is a schematic diagram of a network topology structure according to another embodiment of the present invention.

In addition, for ease of description, a schematic diagram of a network topology structure shown in FIG. 11 is used as an example in this embodiment of the present invention and subsequent embodiments. Referring to FIG. 11, the controller directly connects to ports 0 of the switches by using a port 0, a port 1, and a port 2 respectively, and controls the switches by using the OpenFlow protocol. The switch A directly connects to a port 1 of the switch B by using a port 2, the switch B directly connects to a port 1 of the switch C by using a port 2, and Ethernet connections exist between the controller and the switches and between the switches.

In addition, in this embodiment of the present invention and the subsequent embodiments, a detection packet is an Ethernet packet, and a format of a packet header field in the detection packet is shown in the following Table 2, that is, a destination MAC address is MAC1, a source MAC address is MAC0, a protocol type of the Ethernet packet is X, a load part of the detection packet is Payload, and OAM information added by the controller and/or a switch is added to the Payload part.

TABLE 2

| Dst MAC = MAC1 | Src MAC = MAC0 | Eth Type = X | Payload |
| --- | --- | --- | --- |

As shown in FIG. 10A and FIG. 10B, a procedure of the method provided in this embodiment of the present invention includes the following steps.

1001. A controller determines a detection path.

There may be multiple manners in which the controller determines the detection path. During specific implementation, the multiple manners include but are not limited to the following two manners:

In a first manner, possible detection paths included in a network topology are preconfigured in the controller; therefore, during link quality detection, the controller may select a detection path according to a sequence of the preconfigured detection paths and perform detection, or randomly select a detection path and perform detection. Therefore, the controller may determine the detection path according to network configuration information.

In a second manner, the controller may determine a path, for detection, in a network topology according to a requirement; therefore, the controller may generate a detection path according to network topology information, and use the generated detection path as the determined detection path.

It should be noted that, to differentiate between detection paths in a network topology, each detection path in the network topology may be corresponding to a globally unique detection path ID. In this way, a detection path ID can not only be used to differentiate a detection path from another, but also help each switch on the detection path subsequently determine, according to the detection path ID, whether an obtained detection packet matches a locally prestored flow table entry.

Optionally, to enable each switch on the detection path to determine a to-be-executed operation, the controller needs to send, to each switch on the detection path, a flow table entry corresponding to each switch before detecting a link. The flow table entry corresponding to each switch is used to instruct each switch to: perform matching on the obtained detection packet, add OAM information to the successfully matched detection packet according to the flow table entry prestored in each switch, and then send, to a next switch on the detection path or the controller by using an egress port specified in the flow table entry corresponding to each switch, the detection packet to which the OAM information is added. The following steps 1002 to 1004 are steps in which the controller sends, to each switch on the detection path, the flow table entry corresponding to each switch.

It should be noted that the steps in which the controller sends, to each switch on the detection path, the flow table entry corresponding to each switch are steps prior to detecting link quality, but are not steps that need to be executed each time link quality is being detected. It only needs to be ensured that the flow table entry corresponding to each switch on the detection path has been sent to each switch when link quality is being detected.

1002. The controller sends, to a switch A, a flow table entry corresponding to the switch A, where the flow table entry corresponding to the switch A is used to instruct the switch A to: perform matching on an obtained detection packet, add OAM information to the successfully matched detection packet according to the flow table entry corresponding to the switch A, and then send, to a switch B by using an egress port specified in the flow table entry corresponding to the switch A, the detection packet to which the OAM information is added.

This embodiment of the present invention sets no specific limitation to a manner in which the controller sends, to the switch A, the flow table entry corresponding to the switch A. During specific implementation, with reference to FIG. 11, the controller may send, to the switch A by using the port 0 connected to the switch A, the flow table entry corresponding to the switch A in an Ethernet packet form.

For example, with reference to FIG. 11, content of the flow table entry that is corresponding to the switch A and sent by the controller to the switch A may be: Match (EthType=X, Path-ID=1), Instructions (Apply-Actions (Append (Recv-BW-Used), Output (Port 2))). The content of the flow table entry instructs the switch A to add Recv-BW-Used to a tail of a detection packet whose Ethernet protocol type is X and whose detection path is 1, and then send the detection packet by using the port 2. Append is a new Action defined in OpenFlow in this embodiment of the present invention, and instructs to add specified information to a packet tail, and Recv-BW-Used indicates used bandwidth of an ingress port of the switch.

1003. The controller sends, to the switch B, a flow table entry corresponding to the switch B, where the flow table entry corresponding to the switch B is used to instruct the switch B to: perform matching on the obtained detection packet, add OAM information to the successfully matched detection packet according to the flow table entry corresponding to the switch B, and then send, to a switch C by using an egress port specified in the flow table entry corresponding to the switch B, the detection packet to which the OAM information is added.

This embodiment of the present invention sets no specific limitation to a manner in which the controller sends, to the switch B, the flow table entry corresponding to the switch B. During specific implementation, with reference to FIG. 11, the controller may send, to the switch B by using the port 1 connected to the switch B, the flow table entry corresponding to the switch B in an Ethernet packet format. Content of the flow table entry that is corresponding to the switch B and sent by the controller to the switch B may be consistent with the content of the flow table entry that is corresponding to the switch A and sent by the controller to the switch A in step 1002.

1004. The controller sends, to the switch C, a flow table entry corresponding to the switch C, where the flow table entry corresponding to the switch C is used to instruct the switch C to: perform matching on the obtained detection packet, add OAM information to the successfully matched detection packet according to the flow table entry corresponding to the switch C, and then send, to the controller by using an egress port specified in the flow table entry corresponding to the switch C, a termination detection packet obtained after the OAM information is added.

This embodiment of the present invention sets no specific limitation to a manner in which the controller sends, to the switch C, the flow table entry corresponding to the switch C. During specific implementation, with reference to FIG. 11, the controller may send, to the switch C by using the port 2 connected to the switch C, the flow table entry corresponding to the switch C in an Ethernet packet form.

In addition, it should be noted that because the switch C is the last switch on the detection path, the flow table entry delivered by the controller to the switch C needs to instruct the switch C to add, to the detection packet sent by the switch B, the OAM information corresponding to the switch C to obtain the termination detection packet, and then send the termination detection packet to the controller.

For example, content of the flow table entry that is corresponding to the switch C and sent by the controller to the switch C may be: Match (Dst MAC=MAC1, SRC MAC=MAC0), Instructions (Apply-Actions (Output (CONTROLLER))). The content of the flow table entry indicates that a detection packet whose destination MAC address is MAC1 and whose source MAC address is MAC0 is sent to the controller by using a Packet-In message. CONTROLLER is a special port defined in the OpenFlow protocol, and indicates that a packet is sent to the controller by using a Packet-In message.

1005. The controller sends an initial detection packet to the switch A.

To trigger the link quality detection process, in this embodiment of the present invention, the controller sends the initial detection packet to the switch A, to enable the switch A to obtain the initial detection packet. This embodiment of the present invention sets no specific limitation to a manner in which the controller sends the initial detection packet to the switch A. With reference to FIG. 11, the controller may send the initial detection packet to the switch A in an Ethernet packet format by using the port 0. Certainly, if a type of a network between the controller and the switch A is another network type, and a connection port is another port, the controller sends the initial detection packet to the switch A in a packet format of the another network type by using a port connected to the switch A. This embodiment of the present invention sets no specific limitation to a specific port number or a specific type of the another network type.

It should be noted that, to make the link quality subsequently determined by the controller according to the termination detection packet more diversified and comprehensive, the controller may add OAM information to the initial detection packet when sending the initial detection packet. The OAM information added by the controller to the initial detection packet includes but is not limited to a detection path ID, a packet sequence number of the initial detection packet, and a generation time stamp of the initial detection packet.

The detection path ID added to the initial detection packet not only can identify each detection path, but also can be used for each switch on the detection path to perform matching on an obtained detection packet according to the detection path ID. By adding the packet sequence number of the initial detection packet to the initial detection packet, the controller may collect statistics about a total quantity of initial detection packets that have been sent, so that the controller can determine a packet loss rate according to the total quantity of sent initial detection packets and a total quantity of subsequently received termination detection packets. By adding the sending time stamp of the initial detection packet to the initial detection packet, subsequently, the controller can determine a delay, jitter, and the like of a link according to the generation time stamp of the initial detection packet and a receiving time stamp of the termination detection packet.

In addition to the OAM information added by the controller, the initial detection packet further carries a packet header field, so that subsequently, each switch can also determine, according to a packet header field in an obtained detection packet, whether the obtained detection packet matches the flow table entry prestored in each switch. This embodiment of the present invention sets no limitation to specific content of the packet header field. During specific implementation, the packet header field includes but is not limited to a source MAC address, a destination MAC address, an Ethernet packet protocol type, a source IP address, a destination IP address, a protocol type, a source port number, a destination port number, and the like.

1006. The switch A performs matching on the received initial detection packet according to the received flow table entry, adds the OAM information to the initial detection packet according to the corresponding flow table entry after the matching succeeds, and sends, to the switch B by using the egress port specified in the flow table entry, the detection packet to which the OAM information is added.

The flow table entry received by the switch A is the flow table entry that is corresponding to the switch A and sent by the controller to the switch A in step 1002. To determine whether the switch A needs to process the received initial detection packet, the switch A needs to determine whether the received initial detection packet matches the flow table entry locally prestored in the switch A. Therefore, the switch A performs matching on the received initial detection packet according to the received flow table entry.

This embodiment of the present invention sets no specific limitation to a manner in which the switch A performs matching on the received initial detection packet according to the received flow table entry. During specific implementation, if the initial detection packet carries a detection path ID, the switch A may perform matching on the received initial detection packet according to the detection path ID and/or the packet header field in the initial detection packet. Specifically, the switch A may parse the packet header field and the detection path ID in the received initial detection packet, and perform matching on the received initial detection packet according to at least one piece of information of the packet header field and the detection path ID in the received initial detection packet.

This embodiment of the present invention sets no specific limitation to a manner in which the switch A parses the packet header field and the detection path ID in the received initial detection packet. When specifically performing matching on the received initial detection packet, the switch A may determine, according to the packet header field in the received initial detection packet, whether the received initial detection packet matches the flow table entry locally prestored in the switch A; or may determine, according to the detection path ID carried in the received initial detection packet, whether the received initial detection packet matches the flow table entry locally prestored in the switch A; or may determine, according to both the packet header field and the detection path ID in the received initial detection packet, whether the received initial detection packet matches the flow table entry locally prestored in the switch A.

This embodiment of the present invention sets no specific limitation to a manner of determining, according to at least one piece of information of the packet header field and the detection path ID in the received detection packet, whether the received initial detection packet matches the flow table entry locally prestored in the switch A.

For example, if the switch A determines, according to the detection path ID, whether the received initial detection packet matches the flow table entry locally prestored in the switch A, the switch A may compare a detection path ID value carried in the received initial detection packet with a detection path ID value in the flow table entry prestored in the switch A for implementation. If the detection path ID value carried in the initial detection packet received by the switch A is consistent with the detection path ID value in the flow table entry prestored in the switch A, the switch A determines that the received initial detection packet matches the flow table entry locally prestored in the switch A; if the detection path ID value carried in the initial detection packet received by the switch A is inconsistent with the detection path ID value in the flow table entry prestored in the switch A, the switch A determines that the received initial detection packet does not match the flow table entry locally prestored in the switch A.

For another example, if the switch A determines, according to the packet header field of the received initial detection packet, whether the received initial detection packet matches the flow table entry locally prestored in the switch A, the switch A may compare a packet header field value in the received initial detection packet with a packet header field value in the flow table entry locally prestored in the switch A for implementation. If the packet header field value in the initial detection packet received by the switch A matches the packet header field value in the flow table entry locally prestored in the switch A, the switch A determines that the received initial detection packet matches the flow table entry locally prestored in the switch A; if the packet header field value in the initial detection packet received by the switch A is inconsistent with the packet header field value in the flow table entry prestored in the switch A, the switch A determines that the received initial detection packet does not match the flow table entry locally prestored in the switch A.

This embodiment of the present invention sets no specific limitation to a manner in which the switch A adds the OAM information to the successfully matched initial detection packet. With reference to the packet structure shown in Table 2, the switch A may add, to a payload (Payload) part of the initial detection packet, information specified in the flow table entry corresponding to the switch A.

There may be many kinds of specific content of the OAM information added by the switch A to the initial detection packet. During specific implementation, the OAM information includes but is not limited to at least one piece of information of used bandwidth of an ingress port, idle bandwidth of an ingress port, used bandwidth of an egress port, idle bandwidth of an egress port, a total quantity of detection packets, a detection packet receiving time stamp, and a detection packet sending time stamp. The specific content of the OAM information added by the switch A to the initial detection packet needs to be determined with reference to specific content of the flow table entry that is corresponding to the switch A and sent by the controller to the switch A. For example, if the controller instructs, in the flow table entry corresponding to the switch A, the switch A to add a detection packet receiving time stamp to the obtained detection packet, the switch A adds a receiving time stamp of the initial detection packet to the initial detection packet; and so on.

It should be noted that, to enable a next switch on the detection path or the controller to know which switch does a received detection packet comes from, the switch A further needs to add an ID of the switch A to the received initial detection packet.

This embodiment of the present invention sets no specific limitation to a manner in which the switch A sends, to the switch B by using the egress port specified in the flow table entry, the detection packet to which the OAM information is added. During specific implementation, a port specified in the flow table entry sent by the controller to the switch A needs to be referenced. For example, with reference to FIG. 11 and content in the flow table entry that is corresponding to the switch A and sent by the controller to the switch A in step 1002, if the controller instructs, in the flow table entry that is corresponding to the switch A and sent to the switch A, the switch A to send, by using the port 2, the detection packet to which the OAM information is added, the switch A sends, to the switch B by using the port 2, the detection packet to which the OAM information is added.

1007. The switch B receives the detection packet that is sent by the switch A and to which the OAM information corresponding to the switch A is added.

This embodiment of the present invention sets no specific limitation to a manner in which the switch B receives the detection packet that is sent by the switch A and to which the OAM information corresponding to the switch A is added. During specific implementation, the manner needs to be determined with reference to a port connected to the switch A and a type of a network between the switch B and the switch A. For example, with reference to FIG. 11, if a type of a network between the switch A and the switch B is the Ethernet, and the switch B directly connects to the port 2 of the switch A by using the port 1, the switch B receives, by using the port 1, a detection packet of an Ethernet packet format that is sent by the switch A by using the port 2 and to which the switch A adds the OAM information.

1008. The switch B performs matching on the received detection packet according to the received flow table entry, adds the OAM information to the received detection packet according to the corresponding flow table entry after the matching succeeds, and sends, to the switch C, the detection packet to which the OAM information is added.

The flow table entry received by the switch B is the flow table entry that is corresponding to the switch B and sent by the controller to the switch B in step 1003.

A principle of this step is consistent with the principle of step 1006 in which the switch A performs matching on the received initial detection packet according to the received flow table entry, adds the OAM information to the initial detection packet according to the corresponding flow table entry after the matching succeeds, and sends, to the switch B, the detection packet to which the OAM information is added. For details, refer to the content in step 1006, and the details are not described herein.

1009. The switch C receives the detection packet that is sent by the switch B and to which the OAM information corresponding to the switch A and the OAM information corresponding to the switch B are added.

A principle of this step is consistent with the principle of step 1007 in which the switch B receives the detection packet that is sent by the switch A and to which the OAM information corresponding to the switch A is added. For details, refer to the content in step 1007, and the details are not described herein.

1010. The switch C performs matching on the received detection packet according to the received flow table entry, adds the OAM information to the received detection packet according to the corresponding flow table entry after the matching succeeds, and sends, to the controller, a termination detection packet obtained after the OAM information is added.

The flow table entry received by the switch C is the flow table entry that is corresponding to the switch C and sent by the controller to the switch C in step 1004.

A principle of this step is consistent with the principle of step 1006 in which the switch A performs matching on the received initial detection packet according to the received flow table entry, adds the OAM information to the received initial detection packet according to the corresponding flow table entry after the matching succeeds, and sends, to the switch B, the detection packet to which the OAM information is added. For details, refer to the content in step 1006, and the details are not described herein. However, this step differs from step 1006 in that because the switch C is the last switch on the detection path, the switch obtains the termination detection packet after adding the OAM information corresponding to the switch C to the received detection packet, and the switch C needs to send the termination detection packet to the controller.

This embodiment of the present invention sets no specific limitation to a manner in which the switch C sends the obtained termination detection packet to the controller. During specific implementation, with reference to FIG. 11, the switch C sends the termination detection packet to the controller by using the port 0.

Figure 12:
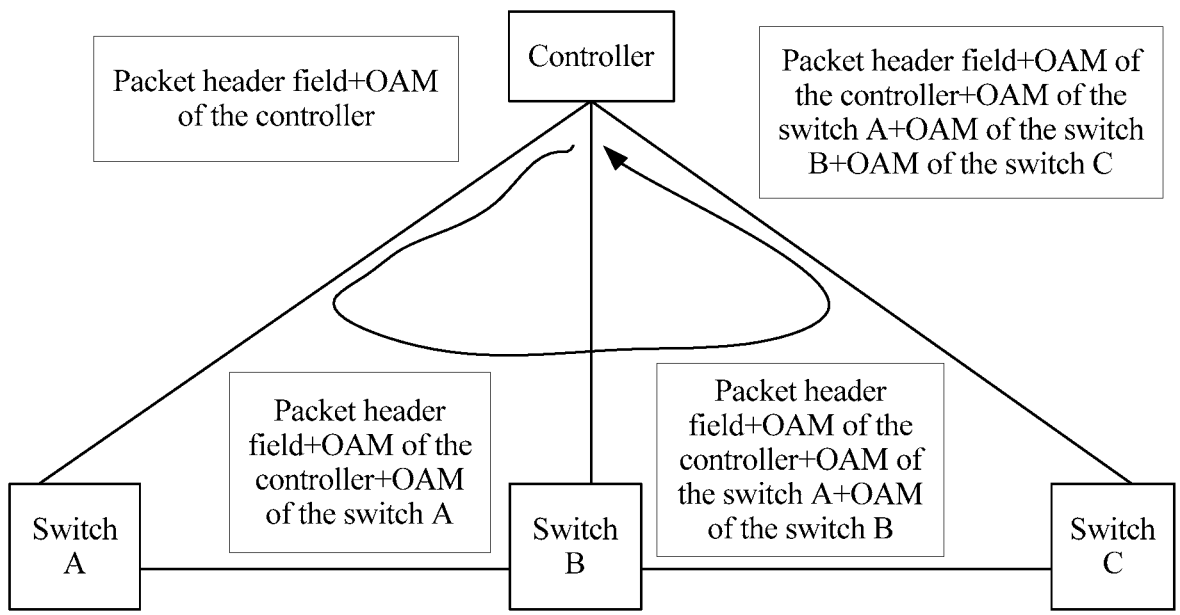
FIG. 12 is a schematic diagram of a transmission path and content of a detection packet according to another embodiment of the present invention.

So far, each switch on the detection path adds the OAM information corresponding to each switch to the received detection packet, and the termination detection packet is obtained. As shown in FIG. 12, FIG. 12 shows a schematic diagram of a transmission path and content of a detection packet according to an embodiment of the present invention.

1011. The controller receives the termination detection packet sent by the switch C.

This embodiment of the present invention sets no specific limitation to a manner in which the controller receives the termination detection packet sent by the switch C. With reference to FIG. 11, the controller receives, by using the port 2 connected to the switch C, the termination detection packet sent by the switch C.

1012. The controller determines link quality according to the termination detection packet.

A manner in which the controller determines the link quality according to the termination detection packet may be determined with reference to specific content of the link quality that the controller needs to determine and specific content of the OAM information added by each switch to the obtained detection packet, where the adding is performed under an instruction of the controller. A specific manner of determining the link quality according to the termination detection packet is described in detail in subsequent embodiments, and details are not described herein. It should be noted that, by using the method provided in this embodiment of the present invention, not only link connectivity can be detected, but also a delay, jitter, bandwidth, a packet loss rate, and the like of a link can be detected.

Optionally, if the link quality in this detection is link connectivity, when the controller controls sending the initial detection packet to the switch A to trigger the link detection process, the controller may control periodically sending the initial detection packet to the switch A. In this case, when determining the link quality according to the termination detection packet, the controller may determine whether no termination detection packet corresponding to each initial detection packet is received within a preset quantity of periods, and if determining that no termination detection packet corresponding to each initial detection packet is received within the preset quantity of periods, determine that the detection path is faulty.

Optionally, when the controller controls detecting link quality, if the controller controls sending the initial detection packet to the switch A to trigger the link detection process, the controller may further add a generation time stamp of the initial detection packet and a packet sequence number of the initial detection packet to the initial detection packet. By adding the packet sequence number of the initial detection packet to the initial detection packet, the controller may collect statistics about a total quantity of initial detection packets that have been sent, so that the controller can determine a packet loss rate according to the total quantity of sent initial detection packets and a total quantity of subsequently received termination detection packets. By adding the generation time stamp of the initial detection packet to the initial detection packet, subsequently, the controller can determine a delay, jitter, and the like of the link according to the generation time stamp of the initial detection packet and a receiving time stamp of the termination detection packet.

For example, if the OAM information added by each switch to the detection packet is a receiving time stamp of the detection packet received by each switch, and the controller adds a generation time stamp of the initial detection packet to the initial detection packet when sending the initial detection packet, the controller may determine a delay between every two switches, a delay of the entire detection path, and the like according to a receiving time stamp of the received termination detection packet. Because a moment when the controller generates the initial detection packet is extremely close to a moment when the controller sends the initial detection packet, the generation time stamp of the initial detection packet is a sending time stamp of the initial detection packet.

For example, if a time stamp of receiving the detection packet by the switch A is 10: 12:30, and a time stamp of receiving the detection packet by the switch B is 10: 12:32, a delay between the switch A and the switch B is 2 s (second). For another example, if a time stamp of sending the initial detection packet by the controller is 10: 12:28, and a time stamp of receiving the termination detection packet is 10: 12:35, the controller determines that a delay of the detection path is 5 s.

It should be noted that, to make information about the detection path determined by the controller more comprehensive, steps 1005 to 1012 may be repeatedly executed.

According to the method provided in this embodiment of the present invention, a controller determines a detection path, and controls each switch on the detection path to obtain a detection packet; after determining that the obtained detection packet matches a prestored flow table entry, each switch adds OAM information to the successfully matched detection packet according to the flow table entry prestored in each switch; and then the controller obtains a termination detection packet obtained after each switch adds the OAM information to the obtained detection packet, and determines link quality according to the termination detection packet. Each switch on a detection path does not need to use a corresponding link quality detection protocol to detect link quality, and only needs to add OAM information to an obtained detection packet according to a prestored flow table entry. In this way, not only a structure of each switch can be simplified, but also operations of each switch are simplified. In addition, a controller needs to interact with only the first switch and the last switch on a detection path. Therefore, service processing efficiency can be improved.

Figure 13A:
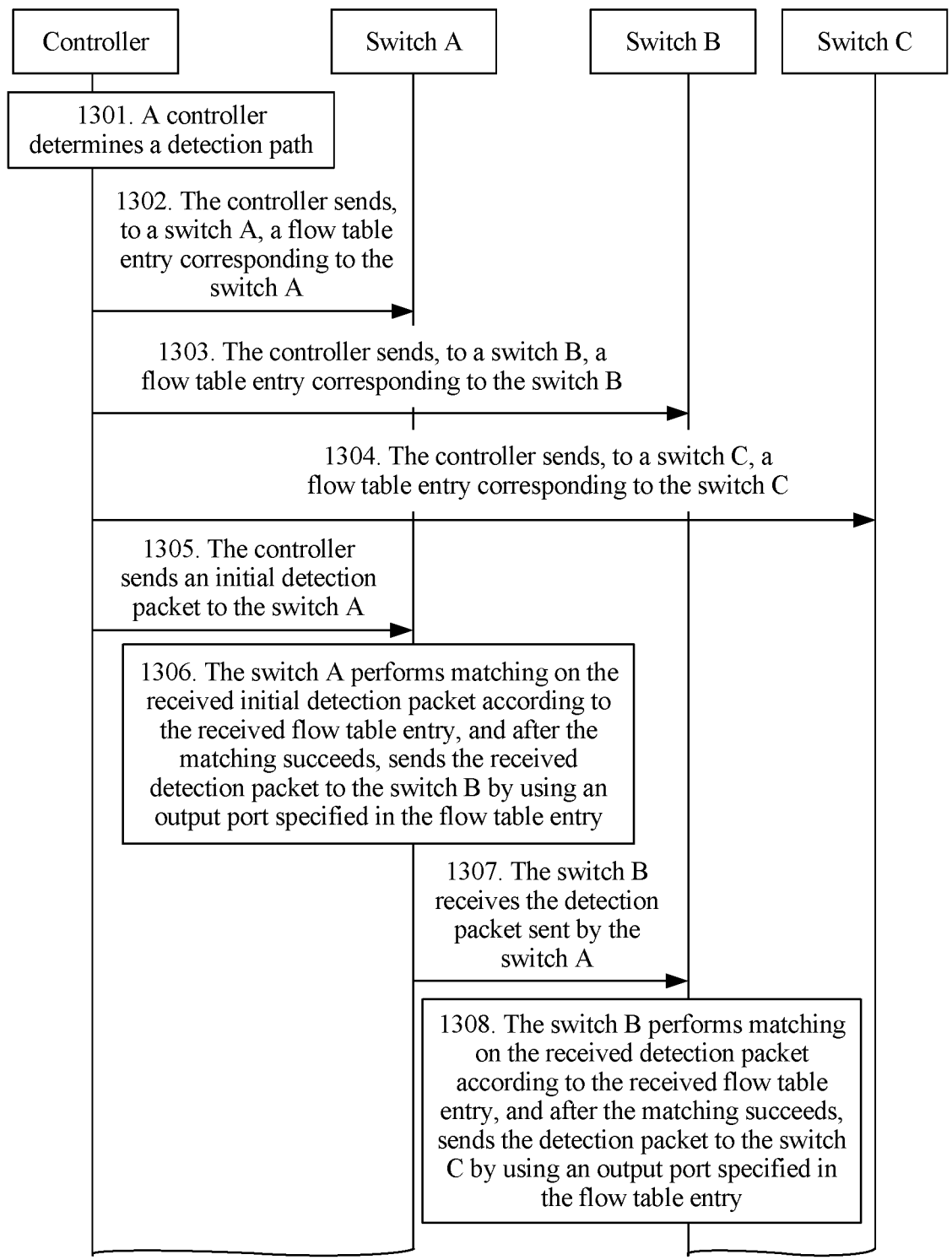
FIG. 13A and FIG. 13B are a flowchart of a link quality detection method according to another embodiment of the present invention.
Figure 13B:
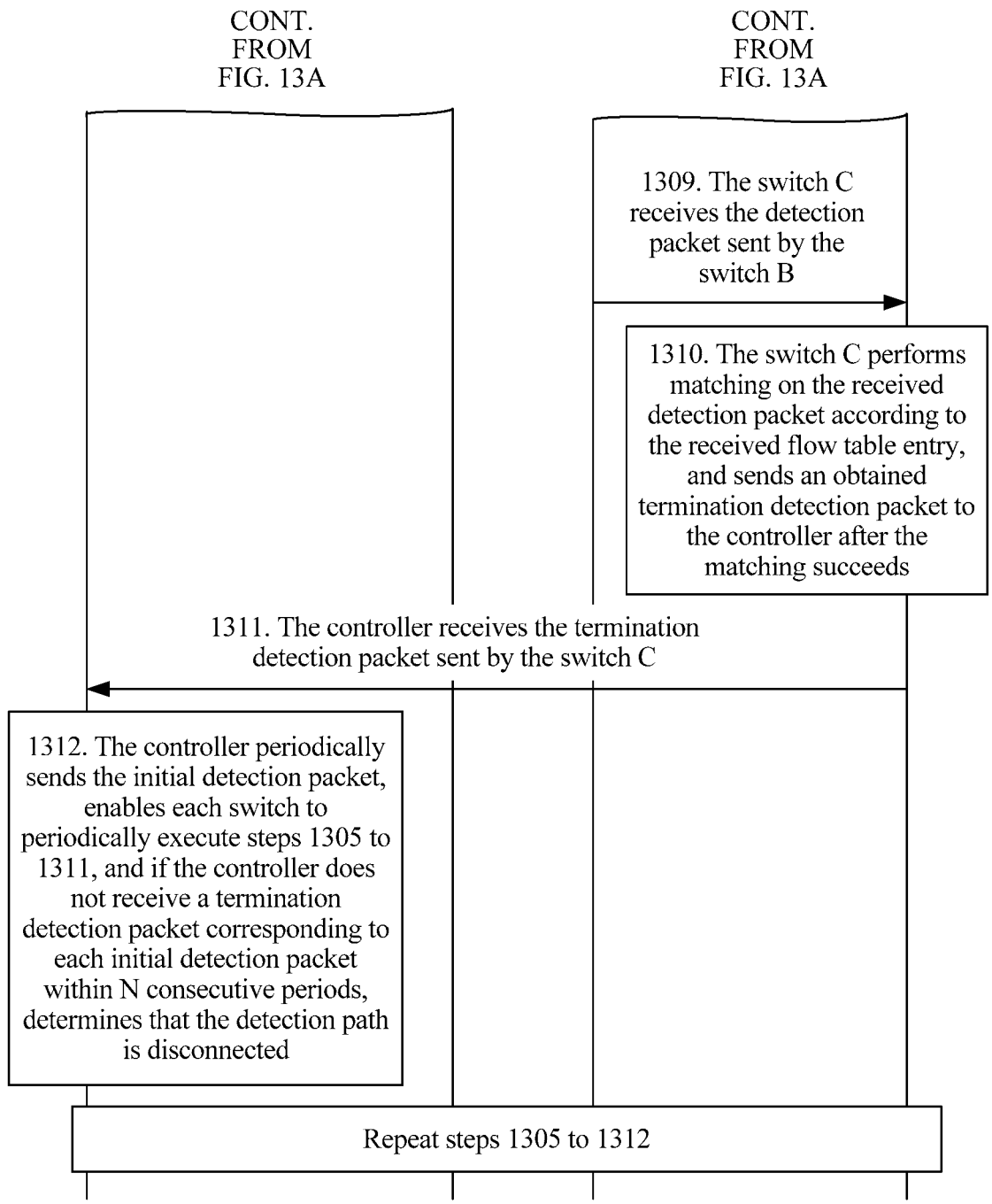

FIG. 13A and FIG. 13B are a flowchart of a link quality detection method according to an example of an embodiment. In this embodiment of the present invention, that a detection path is a controller—a switch A—a switch B—a switch C—the controller is used as an example. In addition, that the controller sends an initial detection packet to the first switch on the detection path to trigger link quality detection, and connectivity of the detection path is detected in this embodiment is used as an example to describe the link quality detection method provided in this embodiment of the present invention. Referring to FIG. 12, a procedure of the method provided in this embodiment of the present invention includes the following steps.

1301. A controller determines a detection path.

A principle of this step is consistent with the principle of step 1001. For details, refer to the content in step 1001, and the details are not described herein.

In addition, it should be noted that, because this embodiment of the present invention is used to detect connectivity of the detection path, the controller may periodically send an initial detection packet, and determine whether no termination detection packet corresponding to each initial detection packet is received within a preset quantity of periods, to implement the detection. Therefore, after determining the detection path, the controller may further determine a period T of sending the initial detection packet and a link disconnection threshold N. If the controller does not receive, within N consecutive periods, a termination detection packet corresponding to an initial detection packet that is sent within the N periods, the controller may determine that the detection packet is disconnected.

This embodiment of the present invention sets no specific limitation to a manner in which the controller determines the period T of sending the initial detection packet and the link disconnection threshold N. During specific implementation, the sending period T and the link disconnection threshold N may be obtained according to configuration information, or may be determined according to a network topology structure. This embodiment of the present invention sets no specific limitation to a specific value of the sending period T or a specific value of the link disconnection threshold N. During specific implementation, the specific values may be set according to a link quality detection requirement.

1302. The controller sends, to a switch A, a flow table entry corresponding to the switch A, where the flow table entry corresponding to the switch A is used to instruct the switch A to: perform matching on an obtained detection packet, and send the successfully matched detection packet to a switch B according to the flow table entry corresponding to the switch A.

A principle of this step is consistent with the principle of step 1002. For details, refer to the content in step 1002, and the details are not described herein.

It should be noted that, in this embodiment of the present invention, the controller determines link connectivity by determining whether no termination detection packet corresponding to each initial detection packet is received within a preset quantity of periods, and this does not involve specific content of OAM information added by each switch to a received detection packet; therefore, a flow table entry that is corresponding to each switch and sent by the controller to each switch may not instruct each switch to add OAM information to the received detection packet. That is, the controller may instruct each switch to add empty OAM information to the received detection packet. In this case, the flow table entry sent by the controller to each switch is used to instruct each switch to perform matching on the received detection packet according to the prestored flow table entry, and send the successfully matched detection packet to a next switch by using an egress port specified in the corresponding flow table entry.

For example, content of the flow table entry sent by the controller to the switch A may be: Match (Dst MAC=MAC1, SRC MAC=MAC0), Instructions (Apply-Actions (Output (Port 2))). The content of the flow table entry instructs the switch A to send a packet whose destination MAC address is MAC1 and whose source MAC address is MAC0 by using a port 2.

1303. The controller sends, to the switch B, a flow table entry corresponding to the switch B, where the flow table entry corresponding to the switch B is used to instruct the switch B to: perform matching on an obtained detection packet, and send the successfully matched detection packet to a switch C according to the flow table entry corresponding to the switch B.

A principle of this step is consistent with the principle of step 1302. For details, refer to the content in step 1302, and the details are not described herein. Content of the flow table entry that is corresponding to the switch B and sent by the controller to the switch B may be consistent with the content of the flow table entry that is corresponding to the switch A and sent by the controller to the switch A in step 1302.

1304. The controller sends, to the switch C, a flow table entry corresponding to the switch C, where the flow table entry corresponding to the switch C is used to instruct the switch C to: perform matching on an obtained detection packet, and send the successfully matched detection packet to the controller according to the flow table entry corresponding to the switch C.

A principle of this step is consistent with the principle of step 1302 in which the controller sends, to the switch A, the flow table entry corresponding to the switch A. For details, refer to the content in step 1302, and the details are not described herein.

In addition, it should be noted that because the switch C is the last switch on the detection path, the flow table entry delivered by the controller to the switch C needs to instruct the switch C to send the received detection packet to the controller.

For example, content of the flow table entry that is corresponding to the switch C and sent by the controller to the switch C may be: Match (Dst MAC=MAC1, SRC MAC=MAC0), Instructions (Apply-Actions (Output (CONTROLLER))). The content of the flow table entry is used to instruct the switch C to send a detection packet whose destination address MAC is MAC1 and whose source address MAC is MAC0 to the controller by using a Packet-In message.

1305. The controller sends an initial detection packet to the switch A.

A principle of this step is consistent with the principle of step 1005. For details, refer to the content in step 1005, and the details are not described herein.

1306. The switch A performs matching on the received initial detection packet according to the received flow table entry, and after the matching succeeds, sends the received detection packet to the switch B by using an egress port specified in the flow table entry.

The flow table entry received by the switch A is the flow table entry that is corresponding to the switch A and sent by the controller to the switch A in step 1302. A principle of this step is consistent with the principle of performing, by the switch A, matching on the received initial detection packet according to the received flow table entry in step 1006 and the principle of sending, to the switch B by using the egress port specified in the flow table entry, the detection packet to which the OAM information is added in step 1006. For details, refer to the content in step 1006, and the details are not described herein.

1307. The switch B receives the detection packet sent by the switch A.

A principle of receiving, by the switch B, the detection packet sent by the switch A is consistent with the principle of step 1007 in which the switch B receives the detection packet that is sent by the switch A and to which the OAM information corresponding to the switch A is added. For details, refer to the content in step 1007, and the details are not described herein.

1308. The switch B performs matching on the received detection packet according to the received flow table entry, and after the matching succeeds, sends the detection packet to the switch C by using an egress port specified in the flow table entry.

The flow table entry received by the switch B is the flow table entry that is corresponding to the switch B and sent by the controller to the switch B in step 1303. A principle of this step is consistent with the principle of performing, by the switch B, matching on the received detection packet according to the received flow table entry in step 1008 and the principle of sending, by the switch B to the switch C, the detection packet to which the OAM information is added in step 1008. For details, refer to the content in step 1006, and the details are not described herein.

1309. The switch C receives the detection packet sent by the switch B.

A principle of this step is consistent with the principle of step 1009 in which the switch C receives the detection packet that is sent by the switch B and to which the OAM information corresponding to the switch A and the OAM information corresponding to the switch B are added. For details, refer to the content in step 1009, and the details are not described herein.

1310. The switch C performs matching on the received detection packet according to the received flow table entry, and sends an obtained termination detection packet to the controller after the matching succeeds.

The flow table entry received by the switch C is the flow table entry that is corresponding to the switch C and sent by the controller to the switch C in step 1304. A principle of this step is consistent with the principle of performing, by the switch C, matching on the received detection packet according to the received flow table entry in step 1010 and the principle of sending, by the switch C to the controller, the termination detection packet obtained after the OAM information is added in step 1010. For details, refer to the content in step 1010, and the details are not described herein.

1311. The controller receives the termination detection packet sent by the switch C.

A principle of this step is consistent with the principle of step 1011. For details, refer to the content in step 1011, and the details are not described herein.

1312. The controller periodically sends the initial detection packet, enables each switch to periodically execute steps 1305 to 1311, and if the controller does not receive a termination detection packet corresponding to each initial detection packet within N consecutive periods, determines that the detection path is disconnected.

According to the method provided in this embodiment of the present invention, a controller determines a detection path, and controls each switch on the detection path to obtain a detection packet; after determining that the obtained detection packet matches a prestored flow table entry, each switch sends the obtained detection packet to a next switch on the detection path; and then the controller obtains a termination detection packet, and determines, according to the termination detection packet, whether no termination detection packet corresponding to an initial detection packet is received within a preset quantity of periods, to determine link connectivity. Each switch on a detection path does not need to use a corresponding link quality detection protocol to detect link quality, and only needs to perform matching on an obtained detection packet according to a prestored flow table entry. In this way, not only a structure of each switch can be simplified, but also operations of each switch are simplified. In addition, a controller needs to interact with only the first switch and the last switch on a detection path. Therefore, service processing efficiency can be improved.

Figure 14A:
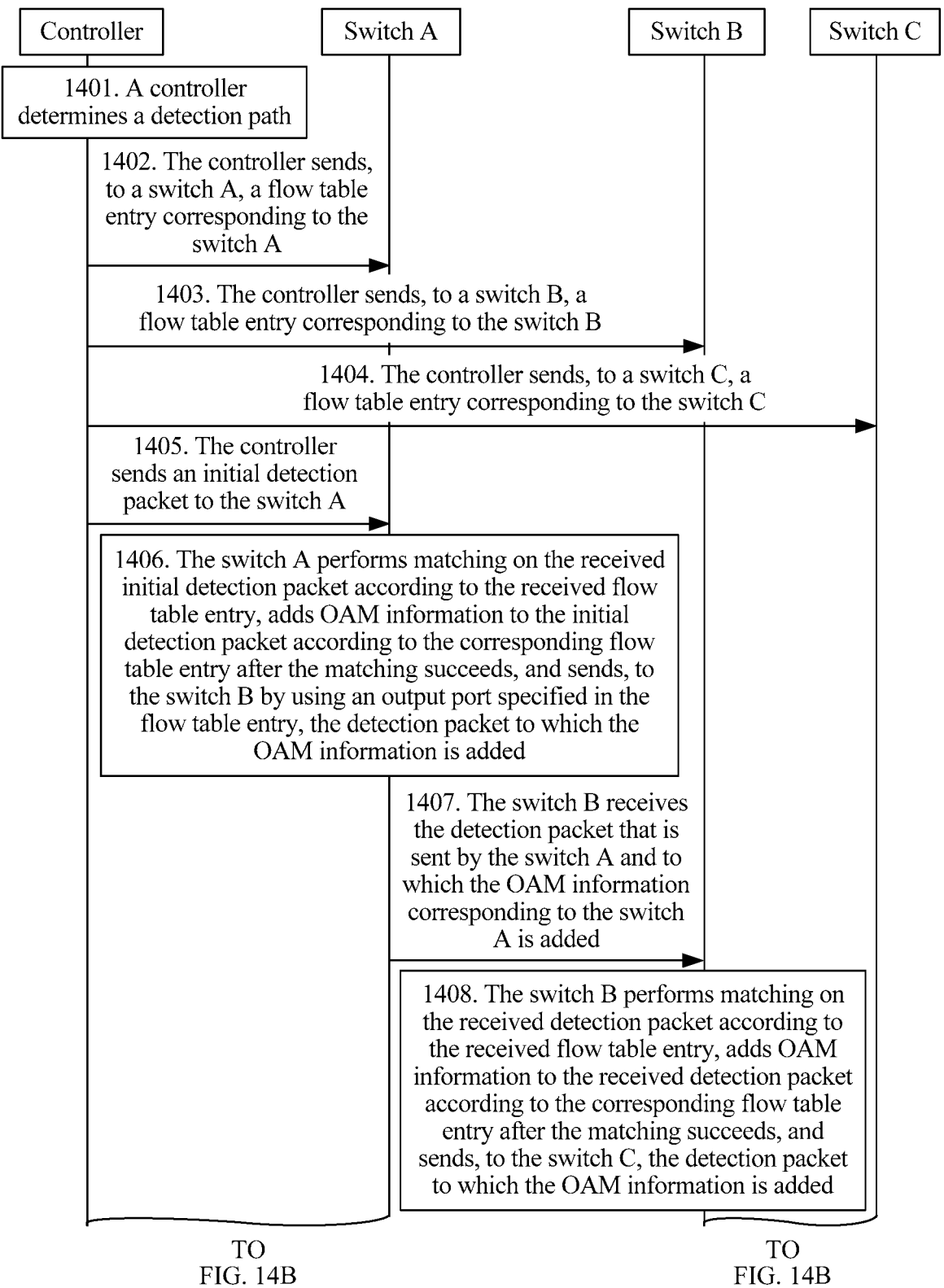
FIG. 14A and FIG. 14B are a flowchart of a link quality detection method according to another embodiment of the present invention.
Figure 14B:
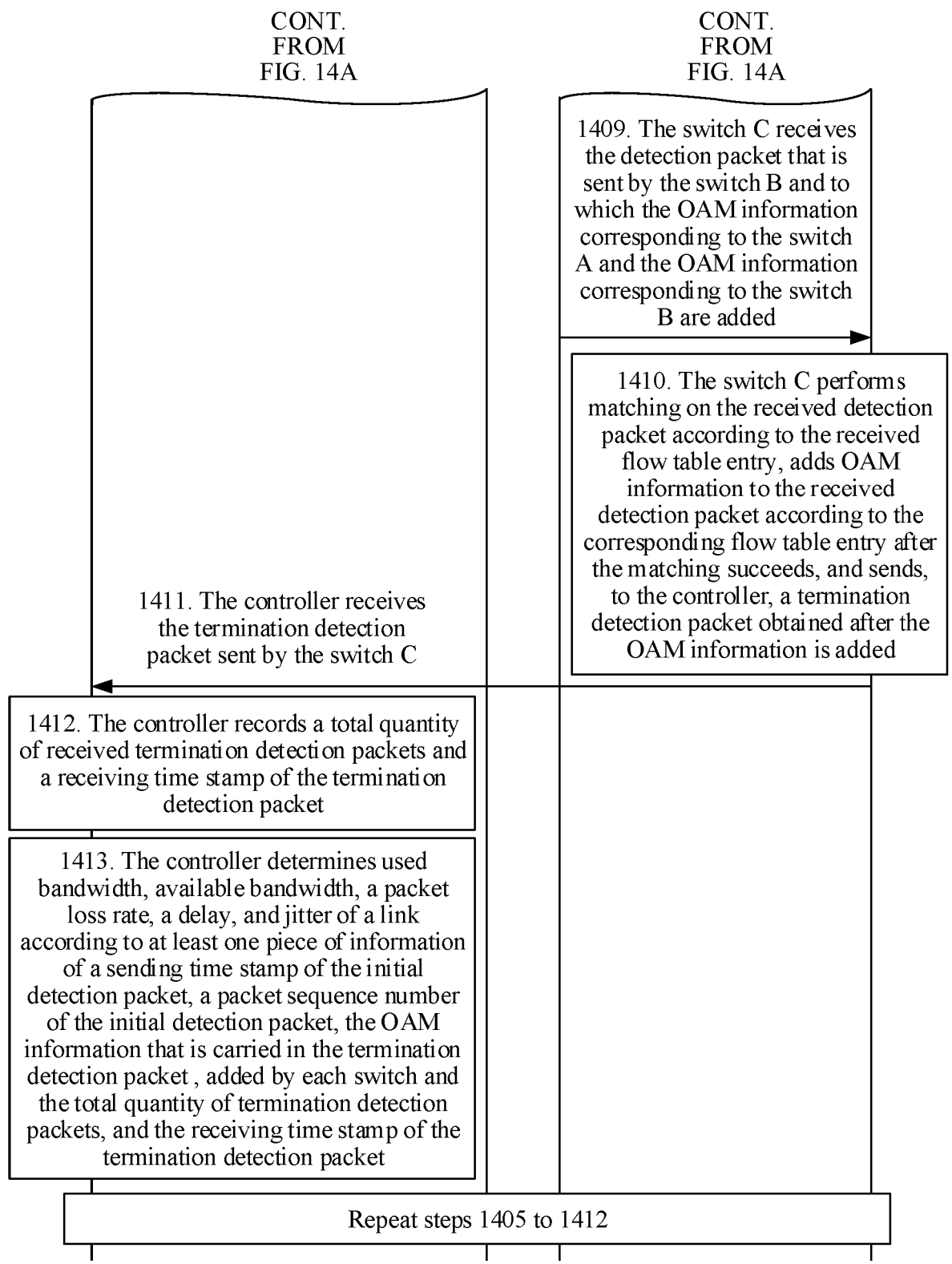

FIG. 14A and FIG. 14B are a flowchart of a link quality detection method according to an example of an embodiment. In this embodiment of the present invention, that a detection path is a controller—a switch A—a switch B—a switch C—the controller is used as an example. In addition, that the controller sends an initial detection packet to the first switch on the detection path to trigger link quality detection, and used bandwidth, available bandwidth, a delay, jitter, and a packet loss rate of the detection path are detected in this embodiment is used as an example to describe the link quality detection method provided in this embodiment of the present invention. Referring to FIG. 14A and FIG. 14B, a procedure of the method provided in this embodiment of the present invention includes the following steps.

1401. A controller determines a detection path.

A principle of this step is consistent with the principle of step 1001 in which the controller determines the detection packet. For details, refer to the content in step 1001, and the details are not described herein.

1402. The controller sends, to a switch A, a flow table entry corresponding to the switch A, where the flow table entry corresponding to the switch A is used to instruct the switch A to: perform matching on an obtained detection packet, add OAM information to the successfully matched detection packet according to the flow table entry corresponding to the switch A, and then send, to a switch B by using an egress port specified in the flow table entry corresponding to the switch A, the detection packet to which the OAM information is added.

A principle of this step is consistent with the principle of step 1002 in which the controller sends, to the switch A, the flow table entry corresponding to the switch A. For details, refer to the content in step 1002, and the details are not described herein.

It should be noted that to detect used bandwidth, available bandwidth, a delay, jitter, and a packet loss rate of a link, in this embodiment, OAM information added by each switch to a received detection packet includes used bandwidth of an ingress port, idle bandwidth of an ingress port, used bandwidth of an egress port, idle bandwidth of an egress port, a total quantity of detection packets, a detection packet receiving time stamp, and a detection packet sending time stamp.

Specifically, in this embodiment of the present invention, a format of the initial detection packet delivered by the controller may be shown in Table 3.

TABLE 3

| DstMAC = MAC1 | Src MAC = MAC0 | Eth Type = X | Path-ID = 1 | Sequence-Number | Time-Stamp |
|---|---|---|---|---|---|

Path-ID indicates a detection path ID; Sequence-Number indicates a sequence number of an initial detection packet, and each time the controller sends an initial detection packet, a sequence number of an initial detection packet increased by 1; Time-Stamp indicates a sending time stamp of an initial detection packet.

OAM information added by each switch to a detection packet is shown in Table 4:

TABLE 4

| Datapath-ID | Recv-BW-Used | Recv-BW-Unused | Send-BW-Used | Send-BW-Unused | Packet-Counter | Recv-Time-Stamp | Send-Time-Stamp |
|---|---|---|---|---|---|---|---|

Datapath-ID indicates an ID of a switch defined in the OpenFlow protocol; Recv-BW-Used indicates used bandwidth of an ingress port; Recv-BW-Unused indicates idle bandwidth of an ingress port; Send-BW-Used indicates used bandwidth of an egress port; Send-BW-Unused indicates idle bandwidth of an egress port; Packet-Counter indicates a total quantity of packets that successfully match flow table entries; Recv-Time-Stamp indicates a detection packet receiving time stamp; and Send-Time-Stamp indicates a detection packet sending time stamp.

With reference to the foregoing content, content of the flow table entry that is corresponding to the switch A and sent by the controller to the switch A may be: Match (Eth Type=X, Path-ID=1), Instructions (Apply-Actions (Append (Datapath-ID, Recv-BW-Used, Recv-BW-Unused, Send-BW-Used, Send-BW-Unused, Packet-Counter, Recv-Time-Stamp, Send-Time-Stamp), Output (Port 2))). The content of the flow table entry is used to instruct the switch A to add Datapath-ID, Recv-BW-Used, Recv-BW-Unused, Send-BW-Used, Send-BW-Unused, Packet-Counter, Recv-Time-Stamp, and then Send-Time-Stamp to a tail of a detection packet whose Ethernet protocol type is X and whose Path-ID is 1, and send the detection packet by using a port 2.

Append is a defined new Action, and instructs to add specified information to a packet tail. Parameters carried in Append specify content of information that needs to be added. Corresponding information added by a switch may be formulated according to a link quality detection requirement, and does not necessarily include all the foregoing information.

It should be noted that for a detection packet whose IP packet header field or the like that includes a detection packet length and/or a checksum, after adding information according to the Append instruction, each switch further needs to update the detection packet length and/or the checksum. This embodiment of the present invention sets no specific limitation to a manner of updating the detection packet length and/or the checksum. During specific implementation, after adding OAM information, each switch may directly update a packet length and/or a checksum; each switch may also add specified information to only a packet tail by using an Append instruction, and updates a packet length and/or a checksum by defining an independent Action, for example, defining the following actions to respectively update a detection packet length in an IP header field and update a checksum in the IP header field:

Update (IP-Length); and
Update (IP-Checksum); where

IP-Length indicates the detection packet length in the IP header field, and IP-Checksum indicates the checksum in the IP header field.

1403. The controller sends, to the switch B, a flow table entry corresponding to the switch B, where the flow table entry corresponding to the switch B is used to instruct the switch B to: perform matching on the obtained detection packet, add OAM information to the successfully matched detection packet according to the flow table entry corresponding to the switch B, and then send, to a switch C by using an egress port specified in the flow table entry corresponding to the switch B, the detection packet to which the OAM information is added.

A principle of this step is consistent with the principle of step 1402 in which the controller sends, to the switch A, the flow table entry corresponding to the switch A. For details, refer to the content in step 1402, and the details are not described herein. Content of the flow table entry that is corresponding to the switch B and sent by the controller to the switch B may be consistent with the content of the flow table entry that is corresponding to the switch A and sent by the controller to the switch A in step 1402.

1404. The controller sends, to the switch C, a flow table entry corresponding to the switch C, where the flow table entry corresponding to the switch C is used to instruct the switch C to: perform matching on the obtained detection packet, add OAM information to the successfully matched detection packet according to the flow table entry corresponding to the switch C, and then send, to the controller by using an egress port specified in the flow table entry corresponding to the switch C, a termination detection packet obtained after the OAM information is added.

A principle of this step is consistent with the principle of step 1402 in which the controller sends, to the switch A, the flow table entry corresponding to the switch A. For details, refer to the content in step 1402, and the details are not described herein. Content of the flow table entry that is corresponding to the switch C and sent by the controller to the switch C differs from the content of the flow table entry that is corresponding to the switch A and sent by the controller to the switch A in step 1402 in that the switch C needs to send, to the controller, the termination detection packet obtained after the OAM information is added.

For example, content of the flow table entry that is corresponding to the switch C and sent by the controller to the switch C may be: Match (Eth Type=X, Path-ID=1), Instruction (Apply-Actions (Append (Datapath-ID, Recv-BW-Used, Recv-BW-Unused, Send-BW-Used, Send-BW-Unused, Packet-Counter, Recv-Time-Stamp, Send-Time-Stamp), Output (CONTROLLER))). The content of the flow table entry is used to instruct the switch C to send a packet whose Ethernet protocol type is X and whose Path-ID is 1 to the controller by using a Packet-In message.

1405. The controller sends an initial detection packet to the switch A.

A principle of this step is consistent with the principle of step 1005 in which the controller sends the initial detection packet to the switch A. For details, refer to the content in step 1005, and the details are not described herein.

1406. The switch A performs matching on the received initial detection packet according to the received flow table entry, adds the OAM information to the initial detection packet according to the corresponding flow table entry after the matching succeeds, and sends, to the switch B by using the egress port specified in the flow table entry, the detection packet to which the OAM information is added.

The flow table entry received by the switch A is the flow table entry that is corresponding to the switch A and sent by the controller to the switch A in step 1402. A principle of this step is consistent with the principle of step 1006 in which the switch A performs matching on the received initial detection packet according to the received flow table entry, adds the OAM information to the initial detection packet according to the corresponding flow table entry after the matching succeeds, and sends, to the switch B by using the egress port specified in the flow table entry, the detection packet to which the OAM information is added. For details, refer to the content in step 1006, and the details are not described herein.

With reference to the content of the flow table entry that is corresponding to the switch A and sent by the controller to the switch A in step 1402, the OAM information added by the switch A to the received initial detection packet includes: Datapath-ID, Recv-BW-Used, Recv-BW-Unused, Send-BW-Used, Send-BW-Unused, Packet-Counter, Recv-Time-Stamp, and Send-Time-Stamp. After adding the foregoing information to the initial detection packet, the switch A sends the detection packet to the switch B by using the port 2.

1407. The switch B receives the detection packet that is sent by the switch A and to which the OAM information corresponding to the switch A is added.

A principle of this step is consistent with the principle of step 1007 in which the switch B receives the detection packet that is sent by the switch A and to which the OAM information corresponding to the switch A is added. For details, refer to the content in step 1007, and the details are not described herein.

1408. The switch B performs matching on the received detection packet according to the received flow table entry, adds the OAM information to the received detection packet according to the corresponding flow table entry after the matching succeeds, and sends, to the switch C, the detection packet to which the OAM information is added.

The flow table entry received by the switch B is the flow table entry that is corresponding to the switch B and sent by the controller to the switch B in step 1403.

A principle of this step is consistent with the principle of step 1006 in which the switch A performs matching on the initial detection packet according to the received flow table entry, adds the OAM information to the received initial detection packet according to the corresponding flow table entry after the matching succeeds, and sends, to the switch B, the detection packet to which the OAM information is added. For details, refer to the content in step 1006, and the details are not described herein.

In addition, content of the flow table entry that is corresponding to the switch B and sent by the controller to the switch B in step 1403 may be the same as the content of the flow table entry that is corresponding to the switch A and sent by the controller to the switch A in step 1402. Therefore, the OAM information added by the switch B to the received detection packet includes: Datapath-ID, Recv-BW-Used, Recv-BW-Unused, Send-BW-Used, Send-BW-Unused, Packet-Counter, Recv-Time-Stamp, and Send-Time-Stamp. After adding the foregoing OAM information to the detection packet, the switch B sends the detection packet to the switch C by using the port 2.

1409. The switch C receives the detection packet that is sent by the switch B and to which the OAM information corresponding to the switch A and the OAM information corresponding to the switch B are added.

A principle of this step is consistent with the principle of step 1009 in which the switch C receives the detection packet that is sent by the switch B and to which the OAM information corresponding to the switch A and the OAM information corresponding to the switch B are added. For details, refer to the content in step 1009, and the details are not described herein.

1410. The switch C performs matching on the received detection packet according to the received flow table entry, adds the OAM information to the received detection packet according to the corresponding flow table entry after the matching succeeds, and sends, to the controller, a termination detection packet obtained after the OAM information is added.

The flow table entry received by the switch C is the flow table entry that is corresponding to the switch C and sent by the controller to the switch C in step 1404.

A principle of this step is consistent with the basic principle of step 1006 in which the switch A performs matching on the received initial detection packet according to the received flow table entry, adds the OAM information to the received initial detection packet according to the corresponding flow table entry after the matching succeeds, and sends, to the switch B, the detection packet to which the OAM information is added. For details, refer to the content in step 1406, and the details are not described herein. This step differs from step 1406 in that after adding the OAM information to the detection packet, the switch C sends, to the controller by using the egress port specified in the received corresponding flow table entry, the termination detection packet obtained after the OAM information is added.

With reference to the content of the flow table entry that is corresponding to the switch C and sent by the controller to the switch C in step 1404, the OAM information added by the switch C to the received detection packet includes: Datapath-ID, Recv-BW-Used, Recv-BW-Unused, Send-BW-Used, Send-BW-Unused, Packet-Counter, Recv-Time-Stamp, and Send-Time-Stamp. After adding the foregoing information to the detection packet, the switch C sends the detection packet to the controller by using the port 0.

1411. The controller receives the termination detection packet sent by the switch C.

A principle of this step is consistent with the principle of step 1011 in which the controller receives the termination detection packet sent by the switch C. For details, refer to the content in step 1011, and the details are not described herein.

1412. The controller records a total quantity of received termination detection packets and a receiving time stamp of the termination detection packet.

This embodiment of the present invention sets no specific limitation to a manner in which the controller records the total quantity of received termination detection packets and the receiving time stamp of the termination detection packet.

1413. The controller determines used bandwidth, available bandwidth, a packet loss rate, a delay, and jitter of a link according to at least one piece of information of a sending time stamp of the initial detection packet, a packet sequence number of the initial detection packet, the OAM information that is carried in the termination detection packet and added by each switch, the total quantity of termination detection packets, and the receiving time stamp of the termination detection packet.

For each of description of the process in which the controller determines the link quality according to the at least one piece of information of the sending time stamp of the initial detection packet, the packet sequence number of the initial detection packet, the OAM information that is carried in the termination detection packet and added by each switch, the total quantity of termination detection packets, and the receiving time stamp of the termination detection packet. The following describes, by using examples, how to calculate the used bandwidth, the available bandwidth, the packet loss rate, the delay, and the jitter of the link according to the OAM information recorded in the detection packet.

For example, two termination detection packets received by the controller are respectively shown in Table 5 and Table 6:

TABLE 5

| DstMAC = MAC1 | Src MAC = MAC0 | Eth Type = X | Path-ID = 1 | Sequence-Number = 10000 | Time-Stamp = T11 | | |
|---|---|---|---|---|---|---|---|
| Datapath-ID = A | Recv-BW-Used = 50M | Recv-BW-Unused = 50M | Send-BW-Used = 60M | Send-BW-Unused = 40M | Packet-Counter = 10000 | Recv-Time-Stamp = TA11 | Send-Time-Stamp = TA12 |
| Datapath-ID = B | Recv-BW-Used = 70M | Recv-BW-Unused = 30M | Send-BW-Used = 40M | Send-BW-Unused = 60M | Packet-Counter = 9995 | Recv-Time-Stamp = TB11 | Send-Time-Stamp = TB12 |
| Datapath-ID = C | Recv-BW-Used = 20M | Recv-BW-Unused = 80M | Send-BW-Used = 50M | Send-BW-Unused = 50M | Packet-Counter = 9990 | Recv-Time-Stamp = TC11 | Send-Time-Stamp = TC12 |

TABLE 6

| DstMAC = MAC1 | Src MAC = MAC0 | Eth Type = X | Path-ID = 1 | Sequence-Number = 20000 | Time-Stamp = T21 | | |
|---|---|---|---|---|---|---|---|
| Datapath-ID = A | Recv-BW-Used = 90M | Recv-BW-Unused = 10M | Send-BW-Used = 50M | Send-BW-Unused = 50M | Packet-Counter = 20000 | Recv-Time-Stamp = TA21 | Send-Time-Stamp = TA22 |
| Datapath-ID = B | Recv-BW-Used = 70M | Recv-BW-Unused = 30M | Send-BW-Used = 40M | Send-BW-Unused = 60M | Packet-Counter = 19985 | Recv-Time-Stamp = TB21 | Send-Time-Stamp = TB22 |

TABLE 6-continued

| DstMAC = MAC1 | Src MAC = MAC0 | Eth Type = X | Path-ID = 1 | Sequence-Number = 20000 | Time-Stamp = T21 | |
|---|---|---|---|---|---|---|
| Datapath-ID = C | Recv-BW-Used = 20M | Recv-BW-Unused = 80M | Send-BW-Used = 50M | Send-BW-Unused = 50M | Packet-Counter = 19980 | Recv-Time-Stamp = TC21 | Send-Time-Stamp = TC22 |

In addition, a total quantity of received termination detection packets that is recorded by the controller when the former termination detection packet (the termination detection packet shown in Table 5) is received is 9990, and a receiving time stamp of the termination detection packet is T12. A total quantity of received termination detection packets that is recorded by the controller when the latter termination detection packet (the termination detection packet shown in Table 6) is received is 19980, and a receiving time stamp of the termination detection packet is T22. Link quality of the detection path: the controller—the switch A—the switch B—the switch C—the controller may be calculated by using the first termination detection packet shown in Table 5.

For example, within a time period from a sending time stamp T11 of a former initial detection packet to the receiving time stamp T12 of the termination detection packet corresponding to the former initial detection packet, idle bandwidth of the detection path is a minimum value of Recv-BW-Unused and Send-BW-Unused that are provided by the switch A, the switch B, and the switch C, that is, Min (50 M, 40 M, 30 M, 60 M, 80 M, 50 M)=30 Mbps. A packet loss rate of the detection path within the time period from T11 to T12 is: 1−(the total quantity of detection packets recorded by the controller within the time period=9990)/(a quantity of initial detection packets sent within the time period=10000)=0.1%. The quantity of sent initial detection packets is a sequence number of an initial detection packet.

Within the time period from T11 to T12, a delay of the detection path is T12−T11. In addition, jitter of the detection path may be calculated according to a delay obtained by calculating multiple time points. A manner of calculating jitter according to a delay includes but is not limited to: obtaining an average value of delays of a preset quantity of time periods, calculating a variance of the delays according to the average value, and using the variance as a jitter value of the detection path within the time period.

In addition, link quality of a part of the detection path may also be calculated according to the former termination detection packet. For example, it may be obtained, by means of calculation, that a delay of a link from the switch A to the switch B is TB11−TA12. Link quality of the detection path: the controller—the switch A—the switch B—the switch C—the controller within a time period from T11 to T22 may further be calculated according to the two termination detection packets. For example, a packet loss rate of the detection path within the time period is: 1−(a total quantity of detection packets received by the controller within the time period=19980−9990)/(a total quantity of initial detection packets sent within the time period=20000−10000)=0.1%. Another link quality index may be deduced from this, and details are not described.

According to the method provided in this embodiment of the present invention, a controller determines a detection path, and controls each switch on the detection path to obtain a detection packet, so that after determining that the obtained detection packet matches a prestored flow table entry, each switch adds OAM information to the successfully matched detection packet according to the flow table entry prestored in each switch; and then the controller obtains a termination detection packet obtained after each switch adds the OAM information to the obtained detection packet, and determines used bandwidth, available bandwidth, a delay, jitter, and a packet loss rate of a link according to the OAM information carried in the termination detection packet. Each switch on a detection path does not need to use a corresponding link quality detection protocol to detect link quality, and only needs to add OAM information to an obtained detection packet according to a prestored flow table entry. In this way, not only a structure of each switch can be simplified, but also operations of each switch are simplified. In addition, a controller needs to interact with only the first switch and the last switch on a detection path. Therefore, service processing efficiency can be improved.

Figure 15A:
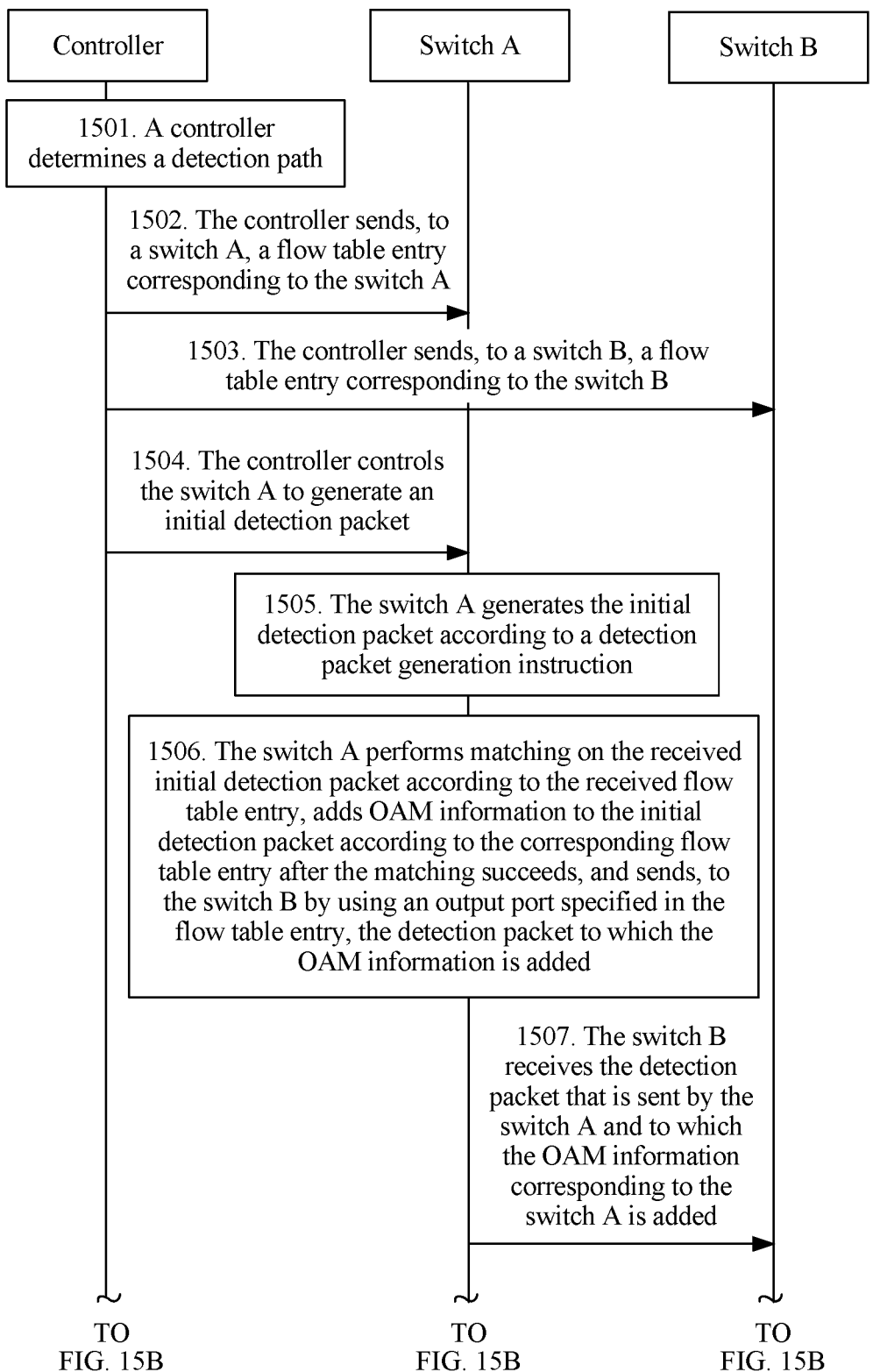
FIG. 15A and FIG. 15B are a flowchart of a link quality detection method according to another embodiment of the present invention.
Figure 15B:
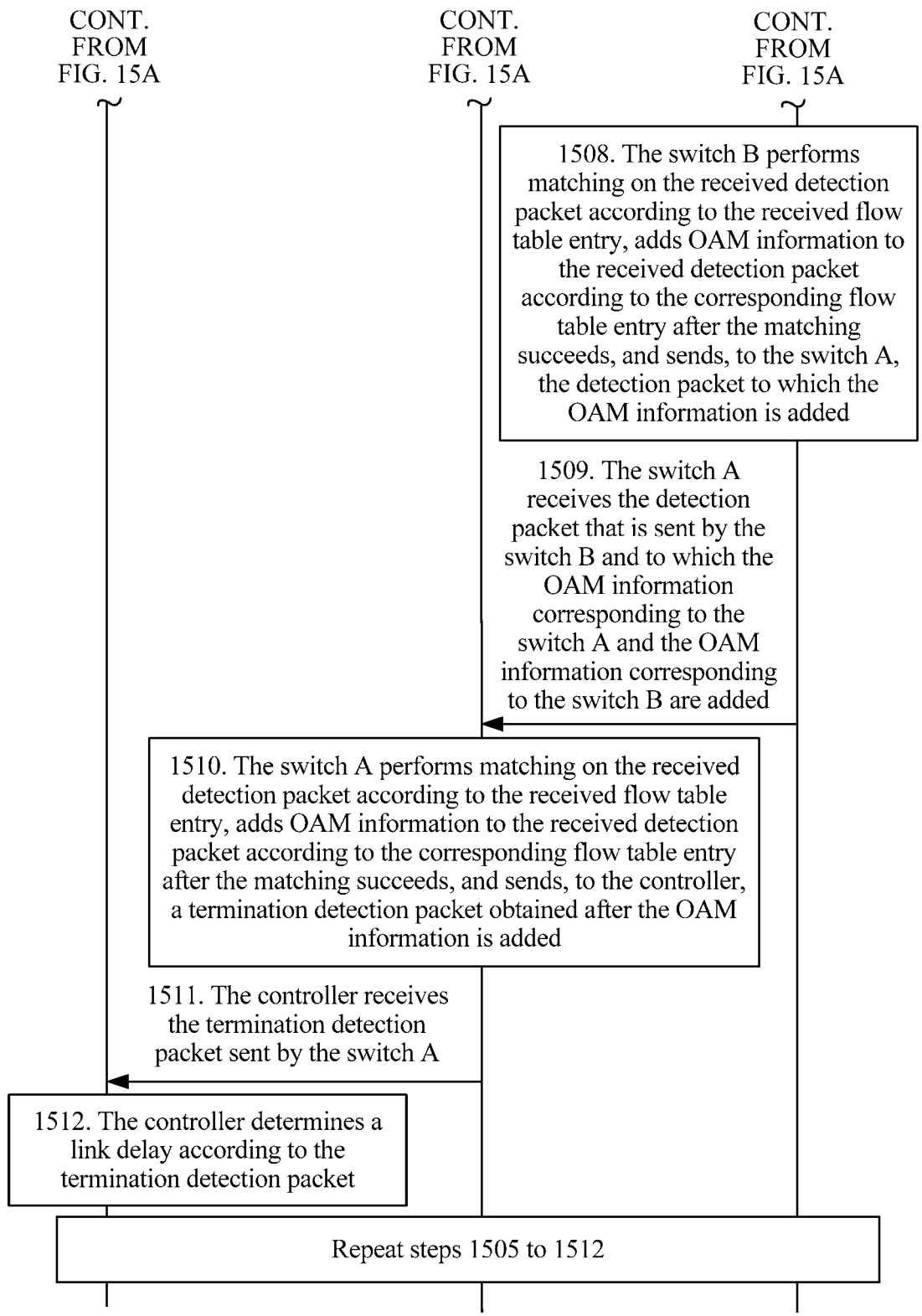

FIG. 15A and FIG. 15B are a flowchart of a link quality detection method according to an example of an embodiment. In this embodiment of the present invention, that a detection path is a switch A—a switch B—the switch A is used as an example. In addition, that the controller instructs the first switch on the detection path to generate an initial detection packet, to trigger link quality detection, and a delay of the detection path is detected in this embodiment is used as an example to describe the link quality detection method provided in this embodiment of the present invention. Referring to FIG. 15A and FIG. 15B, a procedure of the method provided in this embodiment of the present invention includes the following steps.

1501. A controller determines a detection path.

A principle of this step is consistent with the principle of step 1001 in which the controller determines the detection packet. For details, refer to the content in step 1001, and the details are not described herein.

1502. The controller sends, to a switch A, a flow table entry corresponding to the switch A, where the flow table entry corresponding to the switch A is used to instruct the switch A to: perform matching on an obtained detection packet, add OAM information to the successfully matched detection packet according to the flow table entry corresponding to the switch A, and then send, to a switch B by using an egress port specified in the flow table entry corresponding to the switch A, the detection packet to which the OAM information is added; and instruct the switch A to send an obtained termination detection packet to the controller.

A principle of this step is consistent with the principle of step 1002 in which the controller sends, to the switch A, the flow table entry corresponding to the switch A. For details, refer to the content in step 1002. It should be noted that because a start node of the detection path in this embodiment is the switch, the controller needs to instruct the switch to generate the initial detection packet. In addition, because this embodiment is used to detect a delay of the detection path, OAM information added by each switch to an obtained detection packet is a receiving time stamp Time-Stamp of the detection packet. In addition, because a speed of processing a detection packet inside a switch is extremely fast, a sending time stamp and a receiving time stamp of a detection packet are not differentiated in this embodiment of the present invention.

Content of the flow table entry that is corresponding to the switch A and sent by the controller to the switch A may be:

Match (In Port=LOCAL, Eth Type=X, Path-ID=1), Instructions (Apply-Actions (Append (Time-Stamp), Output (Port2))). The content of the flow table entry instructs the switch A to add a Time-Stamp to a tail of a detection packet whose ingress port is LOCAL, whose Ethernet protocol type is X, and whose Path-ID is 1, and then send the detection packet by using a port 2. LOCAL is a special port defined in the OpenFlow protocol, and indicates that the switch generates a packet.

In addition, the switch A on the detection path is also the last switch on the detection path, that is, the switch A needs to send the termination detection packet to the controller. Therefore, the flow table entry that is corresponding to the switch A and sent by the controller to the switch A should further include content instructing the switch A to send the obtained termination detection packet to the controller.

For example, the flow table entry that is corresponding to the switch A and sent by the controller to the switch A may further include the following content: Match (In Port=2, Eth Type=X, Path-ID=1), Instructions (Apply-Actions (Append (Time-Stamp), Output (CONTROLLER))). The content of the flow table entry is used to instruct the switch A to send, by using a Packet-In message, a detection packet whose ingress port is the port 2, whose Ethernet protocol type is X, and whose Path-ID is 1 to the controller after adding the Time-Stamp to the tail of the detection packet.

1503. The controller sends, to the switch B, a flow table entry corresponding to the switch B, where the flow table entry corresponding to the switch B is used to instruct the switch B to: perform matching on the obtained detection packet, add OAM information to the successfully matched detection packet according to the flow table entry corresponding to the switch B, and then send, to the switch A by using an egress port specified in the flow table entry corresponding to the switch B, the detection packet to which the OAM information is added.

A principle of this step is consistent with the principle of step 1003 in which the controller sends, to the switch B, the flow table entry corresponding to the switch B. For details, refer to the content in step 1003, and the details are not described herein. In addition, because the OAM information added by each switch to the received detection packet is a Time-Stamp in this embodiment, content of the flow table entry that is corresponding to the switch B and sent by the controller to the switch B may be: Match (Eth Type=X, Path-ID=1), Instructions (Apply-Actions (Append (Time-Stamp), Output (Port 1))). The content of the flow table entry is used to instruct the switch B to add a Time-Stamp to a tail of a detection packet whose Ethernet protocol type is X and whose Path-ID is 1, and then send the detection packet by using a port 1.

1504. The controller controls the switch A to generate an initial detection packet.

This embodiment of the present invention sets no specific limitation to a manner in which the controller controls the switch A to generate an initial detection packet. During specific implementation, the controller may send a detection packet generation instruction to the switch A, so that the switch A generates an initial detection packet according to the detection packet generation instruction. The detection packet generation instruction sent by the controller to the switch A may be carried in the flow table entry that is corresponding to the switch A and sent by the controller to the switch A.

For example, the controller may send the following detection packet generation instruction to the switch A:

PacketGenerate (Type=ETH, Dst MAC=MAC1, Src MAC=MAC0, Eth Type=X, Path-ID=1, T=10 s, Number=100). PacketGenerate is a new message defined in the OpenFlow protocol, and instructs a switch to generate an Ethernet packet, where a destination MAC address is MAC1, a source MAC address is MAC0, an Ethernet protocol type is X, a Path-ID is 1, a generation period is 10 s, and a total quantity of generated packets is 100.

1505. The switch A generates the initial detection packet according to a detection packet generation instruction.

This embodiment of the present invention sets no specific limitation to a manner in which the switch A generates the initial detection packet according to the detection packet generation instruction.

1506. The switch A performs matching on the received initial detection packet according to the received flow table entry, adds the OAM information to the initial detection packet according to the corresponding flow table entry after the matching succeeds, and sends, to the switch B by using the egress port specified in the flow table entry, the detection packet to which the OAM information is added.

The flow table entry received by the switch A is the flow table entry that is corresponding to the switch A and sent by the controller to the switch A in step 1502.

A principle of this step is consistent with the principle of step 1006 in which the switch A performs matching on the received initial detection packet according to the received flow table entry, adds the OAM information to the initial detection packet according to the corresponding flow table entry after the matching succeeds, and sends, to the switch B by using the egress port specified in the flow table entry, the detection packet to which the OAM information is added. For details, refer to step 1006, and the details are not described herein.

1507. The switch B receives the detection packet that is sent by the switch A and to which the OAM information corresponding to the switch A is added.

A principle of this step is consistent with the principle of step 1007 in which the switch B receives the detection packet that is sent by the switch A and to which the OAM information corresponding to the switch A is added. For details, refer to the content in step 1007, and the details are not described herein.

1508. The switch B performs matching on the received detection packet according to the received flow table entry, adds the OAM information to the received detection packet according to the corresponding flow table entry after the matching succeeds, and sends, to the switch A, the detection packet to which the OAM information is added.

The flow table entry received by the switch B is the flow table entry that is corresponding to the switch B and sent by the controller to the switch B in step 1503.

A principle of this step is consistent with the principle of step 1006 in which the switch A performs matching on the received initial detection packet according to the received flow table entry, adds the OAM information to the initial detection packet according to the corresponding flow table entry after the matching succeeds, and sends, to the switch B by using the egress port specified in the flow table entry, the detection packet to which the OAM information is added. For details, refer to step 1006, and the details are not described herein.

1509. The switch A receives the detection packet that is sent by the switch B and to which the OAM information corresponding to the switch A and the OAM information corresponding to the switch B are added.

A principle of this step is consistent with the principle of step 1007 in which the switch B receives the detection packet that is sent by the switch A and to which the OAM information corresponding to the switch A is added. For details, refer to the content in step 1007, and the details are not described herein.

1510. The switch A performs matching on the received detection packet according to the received flow table entry, adds the OAM information to the received detection packet according to the corresponding flow table entry after the matching succeeds, and sends, to the controller, a termination detection packet obtained after the OAM information is added.

The flow table entry received by the switch A is the flow table entry that is corresponding to the switch A and sent by the controller to the switch A in step 1502.

A principle of this step is consistent with the principle of step 1006 in which the switch A performs matching on the received initial detection packet according to the received flow table entry, adds the OAM information to the received initial detection packet according to the corresponding flow table entry after the matching succeeds, and sends, to the switch B, the detection packet to which the OAM information is added. For details, refer to the content in step 1006, and the details are not described herein.

1511. The controller receives the termination detection packet sent by the switch A.

A principle of this step is consistent with the principle of step 1011. For details, refer to the content in step 1011, and the details are not described herein.

1512. The controller determines a link delay according to the termination detection packet.

Specifically, the controller determines a delay of the detection path according to time stamp information added by each switch to the termination detection packet. The link delay between the switch A and the switch B that is calculated by the controller according to the time stamp information recorded in the detection packet includes a one-way delay and a round trip delay. The one-way delay is a delay from the switch A to the switch B or a delay from the switch B to the switch A. The round trip delay is a delay of the entire detection path.

For example, the delay from the switch A to the switch B may be obtained by subtracting a time stamp added by the switch A to the received detection packet from a time stamp added by the switch B to the received detection packet. The delay of the entire detection path may be obtained by subtracting a time stamp of generating the initial detection packet by the switch A from a time stamp of receiving the termination detection packet by the controller.

Optionally, in the detection process, if the detection needs to be stopped, the controller may deliver a message to the switch A to instruct the switch to stop generating a detection packet. For example, the controller may deliver the following message to the switch A to instruct the switch A to stop generating a detection packet:

StopPacketGenerate (Type=ETH, Dst MAC=MAC1, Src MAC=MAC0, Eth Type=X, Path-ID=1) or StopPacketGenerate (Path-ID=1), where StopPacketGenerate may also be a new message defined in the OpenFlow protocol.

According to the method provided in this embodiment of the present invention, a controller determines a detection path, and controls each switch on the detection path to obtain a detection packet, so that after determining that the obtained detection packet matches a prestored flow table entry, each switch adds OAM information to the successfully matched detection packet according to the flow table entry prestored in each switch; and then the controller obtains a termination detection packet obtained after each switch adds the OAM information to the obtained detection packet, and determines a link delay according to time stamp information carried in the termination detection packet. Each switch on a detection path does not need to use a corresponding link quality detection protocol to detect link quality, and only needs to add OAM information to an obtained detection packet according to a prestored flow table entry. In this way, not only a structure of each switch can be simplified, but also operations of each switch are simplified. In addition, a controller needs to interact with only the first switch and the last switch on a detection path. Therefore, service processing efficiency can be improved.

Figure 16:
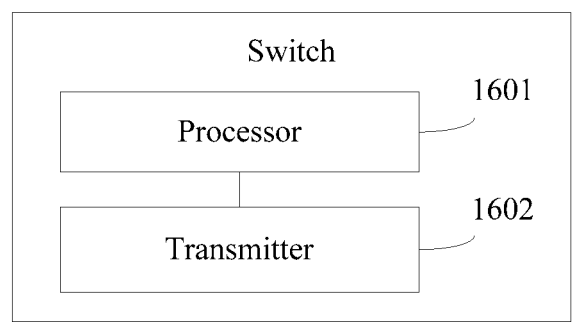
FIG. 16 is a schematic structural diagram of a switch according to another embodiment of the present invention.

FIG. 16 is a schematic structural diagram of a switch according to an example of an embodiment. The switch is configured to execute functions executed by the switch in the link quality detection methods provided in FIG. 7 to FIG. 15A and FIG. 15B. Referring to FIG. 16, the switch includes a processor 1601 and a transmitter 1602.

The processor 1601 is configured to: obtain a detection packet, where the obtained detection packet comes from a controller or a previous switch on a detection path determined by a controller; determine whether the obtained detection packet matches a locally prestored flow table entry; and if the obtained detection packet matches the locally prestored flow table entry, add OAM information to the obtained detection packet according to the locally prestored flow table entry.

The transmitter 1602 is configured to send, to a next switch on the detection path, the detection packet to which the OAM information is added, until the last switch on the detection path adds OAM information to an obtained detection packet according to a prestored flow table entry, to obtain a termination detection packet, and sends the termination detection packet to the controller, and the controller determines link quality according to the termination detection packet.

Optionally, the processor 1601 is further configured to:

when the local switch is the first switch on the detection path, receive an initial detection packet sent by the controller, and use the received initial detection packet as the obtained detection packet; or receive a detection packet generation instruction sent by the controller, generate an initial detection packet according to the detection packet generation instruction, and use the generated initial detection packet as the obtained detection packet; or when the local switch is not the first switch on the detection path, receive a detection packet to which a previous switch on the detection path adds OAM information, and use the received detection packet to which the previous switch adds the OAM information as the obtained detection packet.

Optionally, the switch further includes a receiver, configured to receive and store the flow table entry sent by the controller, where the flow table entry is used to instruct the local switch to: perform matching on the obtained detection packet, add the OAM information to the successfully matched detection packet according to the locally prestored flow table entry to obtain the detection packet to which the local OAM information is added, and then send, to a next switch on the detection path or the controller by using an egress port specified in the flow table entry, the detection packet to which the local OAM information is added.

Optionally, the obtained detection packet carries a detection path identity (ID), and the processor 1601 is further configured to: parse a packet header field and the detection path ID in the obtained detection packet; and determine, according to at least one piece of information of the packet header field and the detection path ID in the obtained detection packet, whether the obtained detection packet matches the locally prestored flow table entry.

Optionally, the OAM information added by the local switch to the obtained detection packet includes at least one piece of information of used bandwidth of an ingress port, idle bandwidth of an ingress port, used bandwidth of an egress port, idle bandwidth of an egress port, a total quantity of detection packets, a detection packet receiving time stamp, and a detection packet sending time stamp.

The switch provided in this embodiment of the present invention obtains a detection packet after a controller determines a detection path, and after determining that the obtained detection packet matches a prestored flow table entry, adds OAM information to the successfully matched detection packet according to the flow table entry prestored in each switch; and then the controller obtains a termination detection packet obtained after each switch adds the OAM information to the obtained detection packet, and determines link quality according to the termination detection packet. A switch does not need to use a corresponding link quality detection protocol to detect link quality, and only needs to add OAM information to an obtained detection packet according to a prestored flow table entry. In this way, not only a structure of the switch can be simplified, but also operations of the switch are simplified. In addition, a controller does not need to interact with each switch. Therefore, service processing efficiency can be improved.

Figure 17:
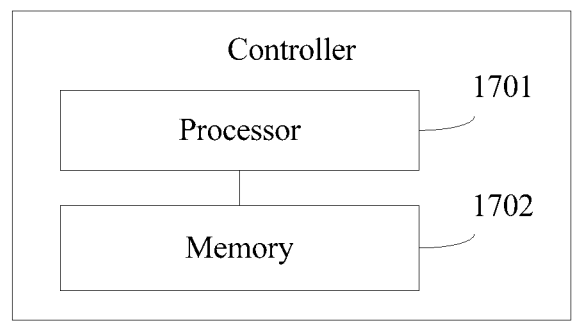
FIG. 17 is a schematic structural diagram of a controller according to another embodiment of the present invention.

FIG. 17 is a schematic structural diagram of a controller according to an example of an embodiment. The controller is configured to execute functions executed by the controller in the link quality detection methods provided in FIG. 7 to FIG. 15A and FIG. 15B. Referring to FIG. 17, the controller includes a processor 1701 and a memory 1702 configured to store an executable instruction of the processor 1701.

The processor 1701 is configured to: determine a detection path, where the detection path includes at least one switch; control each switch on the detection path to obtain a detection packet, so that after determining that the obtained detection packet matches a flow table entry prestored in each switch, each switch adds OAM information to the successfully matched detection packet according to the flow table entry prestored in each switch; obtain a termination detection path obtained after each switch adds the OAM information to the obtained detection packet; and determine link quality according to the termination detection packet.

Optionally, the controller further includes a transmitter, configured to send, to each switch on the detection path, the flow table entry corresponding to each switch, so that each switch receives and stores the flow table entry corresponding to each switch, where the flow table entry corresponding to each switch is used to instruct each switch to: perform matching on the obtained detection packet, add the OAM information to the successfully matched detection packet according to the flow table entry prestored in each switch, and then send, to a next switch on the detection path or the controller by using an egress port specified in the flow table entry corresponding to each switch, the detection packet to which the OAM information is added.

Optionally, the processor 1701 is further configured to determine the detection path according to network configuration information; or generate a detection path according to network topology information, and use the generated detection path as the determined detection path.

Optionally, the processor 1701 is further configured to:

if the switch is the first switch on the detection path, control sending an initial detection packet to the first switch, so that the first switch uses the received initial detection packet as the obtained detection packet; or control sending a detection packet generation instruction to the first switch, so that the first switch generates an initial detection packet according to the detection packet generation instruction, and uses the generated initial detection packet as the obtained detection packet; or if the switch is not the first switch on the detection path, control the switch to: receive a detection packet that is sent by a previous switch on the detection path and to which the previous switch adds OAM information, and use the received detection packet to which the previous switch adds the OAM information as the obtained detection packet.

Optionally, the processor 1701 is further configured to: control periodically sending the initial detection packet to the first switch; determine whether no termination detection packet corresponding to each initial detection packet is received within a preset quantity of periods; and if determining that no termination detection packet corresponding to each initial detection packet is received within the preset quantity of periods, determine that the detection path is faulty.

Optionally, the initial detection packet carries a generation time stamp of the initial detection packet and a packet sequence number of the initial detection packet, and the processor 1701 is further configured to: record a total quantity of received termination detection packets and a receiving time stamp of the termination detection packet; and determine the link quality according to at least one piece of information of the generation time stamp of the initial detection packet, the packet sequence number of the initial detection packet, the OAM information that is carried in the termination detection packet and added by each switch, the total quantity of termination detection packets, and the receiving time stamp of the termination detection packet.

According to the controller provided in this embodiment of the present invention, the controller determines a detection path, and controls each switch on the detection path to obtain a detection packet, so that after determining that the obtained detection packet matches a prestored flow table entry, each switch adds OAM information to the successfully matched detection packet according to the flow table entry prestored in each switch; and then the controller obtains a termination detection packet obtained after each switch adds the OAM information to the obtained detection packet, and determines link quality according to the termination detection packet. Each switch on a detection path does not need to use a corresponding link quality detection protocol to detect link quality, and only needs to add OAM information to an obtained detection packet according to a prestored flow table entry. In this way, not only a structure of each switch can be simplified, but also operations of each switch are simplified. In addition, a controller does not need to interact with each switch. Therefore, service processing efficiency can be improved.

It should be noted that when the switch and the controller provided in the foregoing embodiments are detecting link quality, description is given only using division of the foregoing functional modules. In practice, the functions may be allocated to different functional modules for implementation as required. That is, an internal structure of the apparatus or device is divided into different functional modules to implement all or a part of the functions described above. In addition, the switch, the controller, and the software-defined networking system provided in the foregoing embodiments are based on the same conception as the embodiments illustrating the link quality detection method. For a specific implementation process, refer to the method embodiments, and details are not described herein again.

A person of ordinary skill in the art may understand that all or some of the steps of the embodiments may be implemented by hardware or a program instructing related hardware. The program may be stored in a computer-readable storage medium. The storage medium may include: a read-only memory, a magnetic disk, or an optical disc.

The foregoing descriptions are merely examples of embodiments of the present invention, but are not intended to limit the present invention. Any modification, equivalent replacement, and improvement made without departing from the spirit and principle of the present invention shall fall within the protection scope of the present invention.

What is claimed is:

1. A software-defined networking system, wherein the system comprises:
    a controller, and
    at least two switches,
    wherein the controller is configured with a processor and a non-transitory computer-readable medium including computer executable instructions that, when executed by the processor, facilitate the controller performing:
        determining a detection path comprising the at least two switches;
        controlling each switch of the at least two switches on the detection path to obtain a detection packet, so that each switch on the detection path, after determining that the obtained detection packet matches a prestored flow table entry, adds operation, administration and maintenance (OAM) information to the successfully matched detection packet according to the prestored flow table entry;
        obtaining, after the controlling, a termination detection packet comprising an accumulated OAM information including the OAM information added to the detection packet by each one of the at least two switches in the detection path during the controlling; and
        determining, after the obtaining, a link quality of the detection path comprising the at least two switches according to the accumulated OAM information in the termination detection packet, and
    wherein each respective switch of the at least two switches is configured with a respective processor and a respective non-transitory computer-readable medium including computer executable instructions that, when executed by the respective processor, facilitate the respective switch performing:
        obtaining the detection packet;
        performing a matching on the obtained detection packet;
        adding the OAM information to the successfully matched detection packet according to the corresponding flow table entry, wherein an action instruction included in a field of the corresponding flow table entry specifies the OAM information added to the detection packet, and
        sending, after the adding, either to a next respective switch on the detection path or to the controller, the detection packet to which the OAM information is added.

2. A link quality detection method performed on a local switch, wherein the method comprises:
    obtaining a detection packet, wherein the obtained detection packet comes from a previous switch on a detection path determined by a controller or the controller;
    determining whether the obtained detection packet matches a locally prestored flow table entry;
    adding operation, administration and maintenance (OAM) information to the obtained detection packet, in accordance with a requirement for each switch in the detection path to provide OAM information, according to an action instruction included in a field of the locally prestored flow table entry that specifies the OAM information added to the detection packet when the obtained detection packet matches the locally prestored flow table entry; and
    sending, to a next switch on the detection path, the detection packet to which the OAM information is added, until the last switch on the detection path adds OAM information to an obtained detection packet according to a prestored flow table entry, to obtain a termination detection packet comprising an accumulated OAM information including the OAM information added to the detection packet by each one of the switches in the detection path, and sends the termination detection packet to the controller, and the controller determines link quality according to the termination detection packet.

3. The method according to claim 2, wherein the obtaining a detection packet comprises:
    when the local switch is the first switch on the detection path, receiving an initial detection packet sent by the controller, and using the received initial detection packet as the obtained detection packet; or receiving a detection packet generation instruction sent by the controller, generating an initial detection packet according to the detection packet generation instruction, and using the generated initial detection packet as the obtained detection packet; or
    when the local switch is not the first switch on the detection path, receiving a detection packet to which a previous switch on the detection path adds OAM information, and using the received detection packet to which the previous switch adds the OAM information as the obtained detection packet.

4. The method according to claim 2, before the determining whether the obtained detection packet matches a locally prestored flow table entry, further comprising:
    receiving and storing the flow table entry sent by the controller, wherein the flow table entry is used to instruct the local switch to: perform matching on the obtained detection packet, add the OAM information to the successfully matched detection packet according to the locally prestored flow table entry to obtain the detection packet to which the local OAM information is added, and then send, to a next switch on the detection path or the controller by using an egress port specified in the flow table entry, the detection packet to which the local OAM information is added.

5. The method according to claim 2, wherein the obtained detection packet carries a detection path identity (ID), and the determining whether the obtained detection packet matches a locally prestored flow table entry comprises:

parsing a packet header field and the detection path ID in the obtained detection packet; and determining, according to at least one piece of information of the packet header field and the detection path ID in the obtained detection packet, whether the obtained detection packet matches the locally prestored flow table entry.

6. The method according to claim 2, wherein the OAM information added by the local switch to the obtained detection packet comprises at least one piece of information taken from the group consisting of: used bandwidth of an ingress port, idle bandwidth of an ingress port, used bandwidth of an egress port, and idle bandwidth of an egress port.

7. A link quality detection method, wherein the method comprises:

determining a detection path, wherein the detection path comprises at least two switches;

controlling each switch of the at least two switches on the detection path to obtain a detection packet, so that each switch on the detection path, after determining that the obtained detection packet matches a prestored flow table entry, adds operation, administration and maintenance (OAM) information to the successfully matched detection packet according to the prestored flow table entry, wherein an action instruction included in a field of the prestored flow table entry specifies the OAM information added to the detection packet;

obtaining, after the controlling, a termination detection packet comprising an accumulated OAM information including the OAM information added to the detection packet by each one of the at least two switches in the detection path during the controlling; and determining, after the obtaining, a link quality of the detection path comprising the at least two switches according to the accumulated OAM information in the termination detection packet.

8. The method according to claim 7, before the controlling each switch on the detection path to obtain a detection packet, further comprising:

sending, to each switch on the detection path, the flow table entry corresponding to each switch, wherein the flow table entry corresponding to each switch is used to instruct each switch to: perform matching on the obtained detection packet, add the OAM information to the successfully matched detection packet according to the flow table entry prestored in each switch, and then send, to a next switch on the detection path or the controller by using an egress port specified in the flow table entry corresponding to each switch, the detection packet to which the OAM information is added.

9. The method according to claim 7, wherein the determining a detection path comprises:

determining the detection path according to network configuration information; or generating a detection path according to network topology information, and using the generated detection path as the determined detection path.

10. The method according to claim 7, wherein the controlling each switch on the detection path to obtain a detection packet comprises:

if the switch is the first switch on the detection path, controlling sending an initial detection packet to the first switch, so that the first switch uses the received initial detection packet as the obtained detection packet; or controlling sending a detection packet generation instruction to the first switch, so that the first switch generates an initial detection packet according to the detection packet generation instruction, and uses the generated initial detection packet as the obtained detection packet; or when the switch is not the first switch on the detection path, controlling the switch to:

receive a detection packet that is sent by a previous switch on the detection path and to which the previous switch adds OAM information, and use the received detection packet to which the previous switch adds the OAM information as the obtained detection packet.

11. The method according to claim 10, wherein the controlling sending an initial detection packet to the first switch comprises:

controlling periodically sending the initial detection packet to the first switch; and the determining link quality according to the termination detection packet comprises:

determining whether no termination detection packet corresponding to each initial detection packet is received within a preset quantity of periods; and if determining that no termination detection packet corresponding to each initial detection packet is received within the preset quantity of periods, determining that the detection packet is faulty.

12. The method according to claim 10, wherein the initial detection packet carries a generation time stamp of the initial detection packet and a packet sequence number of the initial detection packet, and after the obtaining a termination detection packet obtained after each switch adds the OAM information to the obtained detection packet, the method further comprises:

recording a total quantity of received termination detection packets and a receiving time stamp of the termination detection packet; and the determining link quality according to the termination detection packet comprises:

determining the link quality further according to at least one piece of information of the group consisting of: the generation time stamp of the initial detection packet, the packet sequence number of the initial detection packet, the total quantity of termination detection packets, and the receiving time stamp of the termination detection packet.

13. A local switch, comprising:

a processor and a non-transitory computer-readable medium including computer-executable instructions that, when executed by the processor, facilitate the switch:

obtaining a detection packet, wherein the obtained detection packet comes from a controller or a previous switch on a detection path determined by a controller;

determining whether the obtained detection packet matches a locally prestored flow table entry;

adding operation, administration and maintenance (OAM) information to the obtained detection packet, in accordance with a requirement for each switch in the detection path to provide OAM information, according to an action instruction included in a field of the locally prestored flow table entry that specifies the OAM information added to the obtained detection packet when the obtained detection packet matches the locally prestored flow table entry; and sending, by a transmitter cooperatively operating with the processor, to a next switch on the detection path, the detection packet to which the OAM information is added, until the last switch on the detection path adds OAM information to an obtained detection packet according to a prestored flow table entry, to obtain a termination detection packet comprising an accumulated OAM information including the OAM information added to the detection packet by each one of the switches in the detection path, and sends the termination detection packet to the controller, and the controller determines link quality according to the termination detection packet.

14. The switch according to claim 13, wherein the processor is configured to:
when the local switch is the first switch on the detection path, receive an initial detection packet sent by the controller, and use the received initial detection packet as the obtained detection packet; or receive a detection packet generation instruction sent by the controller, generate an initial detection packet according to the detection packet generation instruction, and use the generated initial detection packet as the obtained detection packet; or
when the local switch is not the first switch on the detection path, receive a detection packet to which a previous switch on the detection path adds OAM information, and use the received detection packet to which the previous switch adds the OAM information as the obtained detection packet.

15. The switch according to claim 13, wherein the switch further includes a receiver, configured to cooperatively operate with the processor to receive and store the flow table entry sent by the controller, wherein the flow table entry is used to instruct the local switch to: perform matching on the obtained detection packet, add the OAM information to the successfully matched detection packet according to the locally prestored flow table entry to obtain the detection packet to which the local OAM information is added, and then send, to a next switch on the detection path or the controller by using an egress port specified in the flow table entry, the detection packet to which the local OAM information is added.

16. The switch according to claim 13, wherein the obtained detection packet carries a detection path identity (ID), and the processor is configured to: parse a packet header field and the detection path ID in the obtained detection packet; and determine, according to at least one piece of information of the packet header field and the detection path ID in the obtained detection packet, whether the obtained detection packet matches the locally prestored flow table entry.

17. A controller, comprising:
a memory storing computer-executable instructions; and
a processor, configured to execute the computer-executable instructions to facilitate the controller performing a method comprising:
determining a detection path comprising at least two switches;
controlling each switch of the at least two switches on the detection path to obtain a detection packet, so that each switch on the detection path, after determining that the obtained detection packet matches a prestored flow table entry, adds operation, administration and maintenance (OAM) information to the successfully matched detection packet according to an action instruction included in a field of the prestored flow table entry that specifies the OAM information added to the obtained detection packet;
obtaining, after the controlling, a termination detection packet comprising an accumulated OAM information including the OAM information added to the detection packet by each one of the at least two switches in the detection path during the controlling; and
determining, after the obtaining, a link quality of the detection path comprising the at least two switches according to the accumulated OAM information in the termination detection packet.

18. The controller according to claim 17, wherein the controller further comprises a transmitter, configured cooperatively operate with the processor to send, to each switch on the detection path, the flow table entry corresponding to each switch, wherein the flow table entry corresponding to each switch is used to instruct each switch to:
perform matching on the obtained detection packet, add the OAM information to the successfully matched detection packet according to the flow table entry prestored in each switch, and then send, to a next switch on the detection path or the controller by using an egress port specified in the flow table entry corresponding to each switch, the detection packet to which the OAM information is added.

19. The controller according to claim 17, wherein the processor is configured to determine the detection path according to network configuration information; or
generate a detection path according to network topology information, and use the generated detection path as the determined detection path.

20. The controller according to claim 17, wherein the processor is configured to:
if the switch is the first switch on the detection path, control sending an initial detection packet to the first switch, so that the first switch uses the received initial detection packet as the obtained detection packet; or control sending a detection packet generation instruction to the first switch, so that the first switch generates an initial detection packet according to the detection packet generation instruction, and uses the generated initial detection packet as the obtained detection packet; or
if the switch is not the first switch on the detection path, control the switch to: receive a detection packet that is sent by a previous switch on the detection path and to which the previous switch adds OAM information, and use the received detection packet to which the previous switch adds the OAM information as the obtained detection packet.

21. The controller according to claim 20, wherein the processor is further configured to: control periodically sending the initial detection packet to the first switch;
determine whether no termination detection packet corresponding to each initial detection packet is received within a preset quantity of periods; and if determining that no termination detection packet corresponding to each initial detection packet is received within the preset quantity of periods, determine that the detection path is faulty.

22. The controller according to claim 20, wherein the initial detection packet carries a generation time stamp of the initial detection packet and a packet sequence number of the initial detection packet, and the processor is further configured to: record a total quantity of received termination detection packets and a receiving time stamp of the termination detection packet; and determine the link quality further according to at least one piece of information taken from the group consisting of: the generation time stamp of the initial detection packet, the packet sequence number of the initial detection packet, the total quantity of termination detection packets, and the receiving time stamp of the termination detection packet.

23. The system according to claim 1, wherein the OAM information added by each one of the at least two switches comprises at least one piece of information taken from the group consisting of: used bandwidth of an ingress port, idle bandwidth of an ingress port, used bandwidth of an egress port, and idle bandwidth of an egress port.

* * * * *